US007433745B2

(12) United States Patent
Aoki et al.

(10) Patent No.: US 7,433,745 B2
(45) Date of Patent: Oct. 7, 2008

(54) DIGITAL MIXING SYSTEM WITH DUAL CONSOLES AND CASCADE ENGINES

(75) Inventors: Takamitsu Aoki, Hamamatsu (JP); Kei Nakayamai, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 807 days.

(21) Appl. No.: 10/626,358

(22) Filed: Jul. 24, 2003

(65) Prior Publication Data

US 2004/0073419 A1 Apr. 15, 2004

(30) Foreign Application Priority Data

Jul. 30, 2002 (JP) ............................ 2002-220915
Jul. 30, 2002 (JP) ............................ 2002-220941
Jul. 30, 2002 (JP) ............................ 2002-220942
Jul. 30, 2002 (JP) ............................ 2002-220943
Jul. 30, 2002 (JP) ............................ 2002-220944

(51) Int. Cl.
*G06F 17/00* (2006.01)
*H04B 1/00* (2006.01)
*G10H 5/00* (2006.01)
*G10H 1/08* (2006.01)
*G10H 7/00* (2006.01)
*G10H 5/02* (2006.01)

(52) U.S. Cl. ............................ 700/94; 381/119; 369/4; 84/660; 84/625; 84/602; 84/659; 84/653

(58) Field of Classification Search ................. 381/119; 700/94; 369/4; 84/600-602, 622-625, 649-650, 84/666, 659-660, 653

See application file for complete search history.

(56) References Cited

U.S. PATENT DOCUMENTS 4,993,073 A * 2/1991 Sparkes ...................... 381/119

(Continued)

FOREIGN PATENT DOCUMENTS

EP 0 251 646 1/1988

(Continued)

OTHER PUBLICATIONS

James A. Moorer et al., "The Digital Audio Processing Station: A New Concept in Audio Postproduction", Journal of the Audio Engineering Society, Jun. 1986, vol. 34, No. 6, New York, US, pp. 454-463.

*Primary Examiner*—Vivian Chin
*Assistant Examiner*—Devona E Faulk
(74) *Attorney, Agent, or Firm*—Morrison & Foerster LLP

(57) ABSTRACT

A method is designed for controlling a total mixing system including a first mixing system and a second mixing system, which are operated in a linked manner. In the method, the first mixing system stores first scene data specifying contents of a mixing process matching a scene. The second mixing system stores second scene data specifying contents of a mixing process matching a scene. The first mixing system transmits a scene recall request to the second mixing system when a recall event of the first scene data occurs. The second mixing system transmits back a recall enabling response to the first mixing system after receipt of the scene recall request. The first mixing system reconstructs the contents of the mixing process on the basis of the first scene data after the reception of the recall enabling response. The second mixing system reconstructs the contents of the mixing process on the basis of the second scene data after the transmission of the recall enabling response.

22 Claims, 14 Drawing Sheets

DUAL CONSOLE+CASCADING

U.S. PATENT DOCUMENTS

| | | | | | |
|---|---|---|---|---|---|
| 5,402,501 | A | | 3/1995 | Silfvajt et al. | |
| 5,454,041 | A | | 9/1995 | Davis | |
| 5,977,471 | A | * | 11/1999 | Rosenzweig | 84/633 |
| 2002/0082732 | A1 | * | 6/2002 | Suyama et al. | 700/94 |

FOREIGN PATENT DOCUMENTS

| | | | | |
|---|---|---|---|---|
| EP | 251646 | A2 | * | 1/1988 |
| EP | 251646 | A2 | * | 1/1998 |
| JP | 09-298517 | | | 11/1997 |
| JP | 09298517 | A | * | 11/1997 |
| JP | 2000-261391 | | | 9/2000 |
| JP | 2000261391 | A | * | 9/2000 |
| WO | WO 99/37032 | | | 7/1999 |
| WO | WO 99/37046 | | | 7/1999 |
| WO | WO 9937032 | A1 | * | 7/1999 |
| WO | WO 9937046 | A1 | * | 7/1999 |

* cited by examiner

SINGLE CONSOLE

DUAL CONSOLE

CASCADING

DUAL CONSOLE+CASCADING

DIGITAL MIXING SYSTEM WITH DUAL CONSOLES AND CASCADE ENGINES

BACKGROUND OF THE INVENTION

1. Technical Field of the Invention

The present invention relates generally to a mixing system control method, a mixing system control apparatus, and a mixing system control program, which are suitably used for a large-scale mixing system.

2. Prior Art

Recently, digital mixing systems have come into widespread use, especially in the field of professional-use sound equipment. In these systems, sound signals picked up by microphones are all converted into digital signals, which are mixed in a mixing engine constituted by a DSP array and so on. With large-scale digital mixing systems, the mixing console operated by a user and the mixing engine are often separated from each other.

For example, the mixing console is installed at the center of the audience area or in the mixing room which is separated from the audience area, while the engine is installed in the backstage area. This mixing console has a plurality of controls such as faders, all of which may be automatically driven by the CPU of the console. For example, when a scene change has taken place, the faders and other controls may be automatically set to the preset operational positions in accordance with the stage situations at the time. This automatic setting is called "scene recall."

When the operation variable of the fader for example is changed due to a scene recall or an operator's manual operation, the information thereof is sent from the mixing console to the engine, upon which an algorithm or a computation parameter in the engine is determined accordingly. Meanwhile, the processing capacities required for digital mixing systems are various depending on the scales of concerts for example, so that it would be convenient if the processing capacities may be enhanced by combining two or more consoles and engines. In view of this, the technologies for enhancing the processing capacities by cascading two or more mixing systems are disclosed in Japanese Published Unexamined Patent Application 2000-261391 and others.

When a scene recall operation is initiated in one of the cascaded mixing systems with scene recall linked throughout them, scene recall processing is performed in the initiative mixing system and a recall instruction is issued to the other mixing systems. The other mixing systems that have received the recall instruction perform scene recall processing. However, if any of these other systems is performing a top-priority processing operation of its own, such a mixing system cannot immediately perform the instructed recall processing. If this happens, there occurs a problem of a time lag in scene recall execution timing between the mixing systems concerned.

When a plurality of consoles or a plurality of engines are used in a combination, these consoles are operated by different operators. In such a situation, it may be desirable to automatically lower the volume level of monitoring when performing a talk with the operator of each console or between the operators. Such a capability has already been realized by prior-art mixing systems. However, no technologies are available by which the control state of volume level can be freely set for each of the operators in accordance with console installation conditions.

In the above-mentioned prior-art cascading technology, the final mixing result can be obtained only in the rearmost mixing system (cascade master). This configuration makes it impossible to obtain an independent mixing result in each of a plurality of cascaded mixing systems. Likewise, if cue signals in the cascaded mixing systems are mixed over a plurality of stages, the final cue signal can be obtained only in the rearmost mixing system (cascade master), so that it is also difficult to obtain an independent final cue signal in each of the cascaded systems.

The applicant has proposed a dual console system (Japanese patent application 2001-285981, not laid open), in which a pair of consoles are connected to one engine in order to improve the operability. According to this patent application, when an operation event occurs on one of the two consoles, the contents of the event are transmitted to the other console. Consequently, operation events are exchanged between the two consoles, thereby providing the operation data (or operation states) which are common to both consoles. However, if an operation event occurs such as a scene recall which involves large amounts of data to be transmitted at a time, a problem is caused that a time lag in the operation timing between the two consoles occurs due to the transmission delay of the data. On the other hand, if a communication path fast enough for transmitting the data between the two consoles without delay is arranged, the time lag in the operation timing is mitigated, but at the expense of an increased cost.

When a plurality of consoles or a plurality of engines are used in a combination, these consoles are operated by different operators. In such a situation, it is desirable for the operator of each console to monitor the signal systems without restriction and for the monitoring operations of all operators to be independent of each other. However, the prior-art mixing systems are not adapted to such a mode of operations, thereby presenting problems that it is difficult to monitor a plurality of systems, and the operation by one operator affects the monitoring by another operator, for example.

SUMMARY OF THE INVENTION

It is therefore a first object of the present invention to provide a mixing system control method, a mixing system control apparatus, and a program which synchronize a plurality of mixing systems in a correct timing relation.

It is therefore a second object of the present invention to provide a mixing system control method, mixing systems, a mixing system control apparatus, and a program which are intended to realize an optimum communication environment in accordance with the installation conditions of consoles and so on.

It is therefore a third object of the present invention to provide a mixing method, a bidirectional cascaded digital mixer, and a program which enhance the throughput by use of a plurality of mixing systems while providing high independency between them.

It is therefore a fourth object of the present invention to provide a mixing system control method, a mixing system control apparatus, and a program which synchronize a plurality of consoles in a correct timed relation with a low-cost configuration.

It is therefore a fifth object of the present invention to provide a mixing system control method, a mixing system control apparatus, and a program which are intended to realize a monitoring environment providing a high degree of freedom for a plurality of operators and a high independency between the operations performed by these operators.

In order to solve the above-mentioned problems, the following configurations are presented herein. It should be noted that each notation in parentheses denotes an illustrative configuration.

In a first aspect of the invention, a mixing system control method is designed for operating a first mixing system and a second mixing system in a linked manner. The method is carried out by: a storage step for storing first scene data and second scene data specifying contents of scene-dependent mixing process into the first mixing system and the second mixing system respectively; a scene recall request transmission step (SP238) for transmitting, when a recall event of the first scene data occurs in the first mixing system (100A, 100B, 200E), a scene recall request from the first mixing system to the second mixing system (100C, 100D, 200F); a recall enabling response transmission step (SP274) for transmitting, after the reception by the second mixing system of the scene recall request, a recall enabling response from the second mixing system to the first mixing system; a first reconstruction step (SP252) for reconstructing, after the reception of the recall enabling response by the first mixing system, contents of mixing process by the first mixing system on the basis of the first scene data; and a second reconstruction step (SP282) for reconstructing, after the transmission of the recall enabling response by the second mixing system, contents of mixing process by the second mixing system on the basis of the second scene data.

The inventive mixing system control method further comprises a recall start command transmission step (SP250) for transmitting a recall start command to the second mixing system after the recall enabling response is received in the first mixing system, wherein the first reconstruction step (SP252) is executed in the first mixing system after the completion of the recall start command transmission step and the second reconstruction step (SP282) is executed after the reception of the recall start command by the second mixing system.

The inventive mixing system control method further comprises a parameter transmission step (SP248) for transmitting a linked parameter to the second mixing system after the reception of the recall enabling response by the first mixing system, wherein the recall start command transmission step (SP250) is executed after the end of the parameter transmission step (SP248).

In a second aspect of the invention, a mixing system control method is designed for a plurality of interconnected mixing systems. The method is carried out by: a determination step (SP212, SP214) for determining whether the plurality of mixing systems each capable of inputting and outputting of a talk signal (talkback signal, communication signal) and outputting of a monitor signal can operate in a cooperative manner (by cascading); and if the plurality of mixing systems are found to be capable of operating in an cooperative manner, an influencing step for exercising, on the basis of a talk signal in one mixing system, an effect to a monitor signal in another mixing system.

Preferably, in the inventive mixing system, each of the plurality of mixing systems has at least one console in which the monitor signal is received and a talkback signal is outputted as the talk signal, and the influencing step (switch 322_e_, adder 314_e_) mixes the talkback signal in one mixing system with the monitor signal in another mixing system.

Preferably, in the inventive mixing system control method, each of the plurality of mixing systems has at least one console in which the monitor signal is received, a talkback signal is outputted as the talk signal, and the volume of the monitor signal is automatically attenuated at the time of inputting the talkback signal and, when the talkback signal is inputted in one mixing system and the volume of a corresponding monitor signal is automatically attenuated, the influencing step (switches 366_e_ and 366_f_, monitor amplifiers 152_a_ and 152_b_) also attenuates the volume of a monitor signal in another mixing system in a cooperative manner.

Preferably, in the inventive mixing system control method, each of the plurality of mixing systems has at least one console in which the monitor signal is received and a communication signal is received as the talk signal and the influencing step (switch 308_e_, adder 312_e_) mixes a communication signal supplied to one mixing system with a monitor signal in another mixing system.

Preferably, the inventive mixing system control method further comprises, after the determination step and before the influencing step, an adding step (adder 314_e_) for adding a communication signal supplied to the one mixing system to a communication signal supplied to the another mixing system; and a gate step (gate circuit 318_e_) for gating the resultant added communication signal only if the signal level of the resultant added communication signal exceeds a predetermined threshold.

Another inventive mixing system control method is designed for a plurality of interconnected mixing systems. The method is performed by a determination step (SP212, SP214) for determining whether the plurality of mixing systems each capable of inputting and outputting of a talk signal and outputting of a monitor signal can operate in a cooperative manner; and if the plurality of mixing systems are found to be capable of operating in a cooperative manner (by cascading), an output step (adders 352_e_, 362_e_, 364_e_) for mixing the talkback signal in one mixing system with the talkback signal in another mixing system and outputting a resultant mixed signal as a talkback output signal in each of the plurality of mixing systems.

In a third aspect of the invention, a mixing method is applicable to one digital mixer. The method is carried out by: a first adding step (a mixing bus 244_e_) for adding a plurality of input signals and outputting an input added signal; a cascade output step (signal output from 244e to an adder 266_f_) for outputting the input added signal as a cascade signal; a cascade input step (signal input from a mixing bus 244_f_ to an adder 266_e_) for inputting a cascade signal inputted from another digital mixer; a delay step (a delay circuit 264_e_) for delaying the input added signal; and a second adding step for adding the delayed input added signal and the inputted cascade signal and outputting a resultant signal a mixing output signal.

Another inventive mixing method is applicable to one digital mixer having a plurality of mixing lines (first and second cue signals CUE1 and CUE2 and mixing output). The method is performed for each of the plurality of mixing lines by the steps: a first adding step for adding a plurality of input signals and outputting an input added signal; a cascade output step for outputting the input added signal as a cascade signal; a cascade input step for inputting a cascade signal outputted from another digital mixer; a delay step for delaying the input added signal; an on/off step (274_e_, 274_f_, 280_e_, and 280_f_) for turning on/off a link; and a second adding step for adding the delayed input added signal and the inputted cascade signal and outputting a resultant signal as a mixing signal if the link is turned on and outputting the delayed added signal as a mixing signal without change if the link is turned off.

Preferably, the inventive mixing method further comprises a determination step (CPU 118, SP212, and SP214) for determining whether the one digital mixer is capable of cooperating (by cascading) with the another digital mixer, wherein the second adding step adds the delayed input added signal and the inputted cascade signal and outputting a resultant signal as the mixing output signal if the cooperation is found in the determination step.

In a fourth aspect of the invention, a mixing system control method is designed for a mixing system composed of a first console (100A), a second console (100B), and an engine (200E) for executing a mixing process. The method is performed by: a storage step for storing first control data (scene data or library data) and second control data (scene data or library data) for specifying contents of mixing process to be set to the engine; and a determination step (SP117, SP118) for determining whether there is an inconsistency between the first control data and the second control data at interconnecting the first console and the second console.

Preferably, the mixing system control method further comprises a first writing step (SP120) for displaying a screen for checking whether to match the first control data with the second control data if there is found an inconsistency in the determination step and then writing, instead of the second control data, the first control data at a portion specified to be matched to the second console (100B).

Another inventive mixing system control method is designed for a mixing system composed of a first console (100A), a second console (100B), and an engine (200E) for executing a mixing process. The method is carried out by: a storage step for storing first control data and second control data specifying contents of mixing process to be set to the engine in the first console and the second console respectively; a determination step (SP117, SP118) for determining whether there is an inconsistency between the first control data and the second control data; a display step (FIG. 14) for displaying a result display screen for displaying a consistent portion and an inconsistent portion on the basis of an operation performed on the first console or a second console; and a writing step (SP170 through SP176) for writing, instead of the second control data, the first control data about a portion specified to be matched to the second console (100B) on the basis of the operation performed on the result display screen.

A further inventive mixing system control method is designed for a mixing system composed of a first console (100A) and a second console (100B) each having a current storage (122*a*) for storing control data indicative of a current setting state and a control data storage (122*b*, 122*c*) for storing a plurality of control data indicative of a plurality of setting states and an engine (200E) for executing a mixing process. The method is carried out by: a transmission step (SP154) for, when an operation for specifying a recall of the control data is performed on any one of the first console and the second console, transmitting an operation event indicative of the operation from the console on which the operation has been performed to the other console; a first update step (SP156) for copying by the console on which the operation has been performed the control data specified by the operation among the plurality of control data stored in the control data storage of the control on which the operation has been performed into the current storage (122*a*) of the other console; a second update means (SP166) for copying, upon reception of the transmitted operation event by the other console, the control data specified by the operation among the plurality of control data stored in the control data storage into the current storage of the other console; and a mixing control step (SP182) for controlling the mixing process by the engine on the basis of the control data stored in the current storage (122*a*) in the first console regardless contents of in the current storage in the second console.

Preferably, the mixing system control method further comprises: a determination step (SP162, SP164) for, when the control data are copied from the control data storage into the current storage in the second update step in the other console, determining whether there is a match between the control data stored in the current storage of the other console and the control data to be copied; and a warning step (SP168) for executing a warning display operation at least on the second console if an inconsistency is found in the determination step regardless of whether the other console is the first console or the second console.

In a fifth aspect of the invention, a mixing system control method is designed for a mixing system composed of an engine (200E) for executing a mixing algorithm and a plurality of consoles (100A, 100B) for monitoring the engine. The method is performed by: a selecting step (250) for selecting an audio signal at a given stage in the mixing algorithm and outputting the selected audio signal as a first monitor signal (MON1); a selecting step (252) for selecting an audio signal at a given stage in the mixing algorithm independently of the first monitor signal (MON1) and outputting the selected audio signal as a second monitor signal (MON2); under the condition that only one console is connected to the engine, a setting step for placing both of the first and second monitor signals (MON1, MON2) into an active state on the basis of a selecting operation performed on the one console; under the condition that a plurality of consoles are connected to the engine, a setting step for placing the first monitor signal (MON1) into an active state on the basis of a selecting operation performed on a first console; and under the condition that a plurality of consoles are connected to the engine, a setting step for placing the second monitor signal (MON2) into an active state on the basis of a selecting operation performed on a second console.

Another inventive mixing system control method is designed for a mixing system composed of an engine (200E) for executing a mixing algorithm and a plurality of consoles (100A, 100B) for monitoring the engine. The method is performed by: under the condition that only one console is connected to the engine, a mixing step for mixing, in the engine, an audio signal at one or more stages cue-specified by the console and outputting a resultant signal to the console as a single cue signal; under the condition that a plurality of consoles are connected to the engine, a mixing step for mixing, in the engine, one or more audio signals cue-specified by a first console and outputting a resultant signal to the first console as a first cue signal (CUE1); under the condition that a plurality of consoles are connected to the engine, a mixing step for mixing, in the engine, one or more audio signals cue-specified by a second console and outputting a resultant signal to the second console as a second cue signal (CUE2); an on/off step for turning on/off a cue link; and if the cue link is turned on, a linking step for linking the cue specification in the first console with the cue specification in the second console.

A further inventive mixing system control method is designed for a mixing system composed of an engine (200E) for executing a mixing algorithm and a first console (100A) and a second console (100B) which monitor the engine. The method is performed by a sequence of: a forming step for forming a first monitor signal (MON1) on the basis of a selecting operation performed on the first console; a forming step for forming a second monitor signal (MON2) on the basis of a selecting operation performed on the second console; a setting step (on/off of a switch 308*e*) for setting a first talk state, which is the state of talk from the second console to the first console; a mixing step for mixing a talkback signal in the second console with the first monitor signal on the basis of the first talk state set in the setting step; a setting step (on/off of a switch 324*e*) for setting a second talk state, which is the state of talk from the first console to the second console; and a mixing step for mixing a talkback signal in the first console with the second monitor signal on the basis of the second talk state set in the setting step.

Preferably, the inventive mixing system control method further comprises: an attenuating step for turning on the input of a talkback signal from the first console in response to the turning-on operation of a talkback switch arranged on the first console to attenuate the first monitor signal for the first console; an attenuating step for turning on the input of a talkback signal from the second console in response to the turning-on operation of a talkback switch arranged on the second console to attenuate the second monitor signal for the second console; an on/off step for turning on/off (the on/off state of a switch 154*a*) the link between the attenuation of the first monitor signal and the attenuation of the second monitor signal; and if one of the first monitor signal and the second monitor signal is attenuated under the condition that the link for the attenuation is turned on, an attenuating step for attenuating the other monitor signal in cooperation with the attenuated monitor signal.

Preferably, the inventive mixing system control method further comprises: a mixing step for mixing the talkback signal from the first console with the talkback signal from the second console; and an output step for outputting the mixed talkback signal from the engine as a talkback output signal.

DETAILED DESCRIPTION OF THE INVENTION

1. Hardware Configurations of Embodiments

1.1 Console

Figure 1:
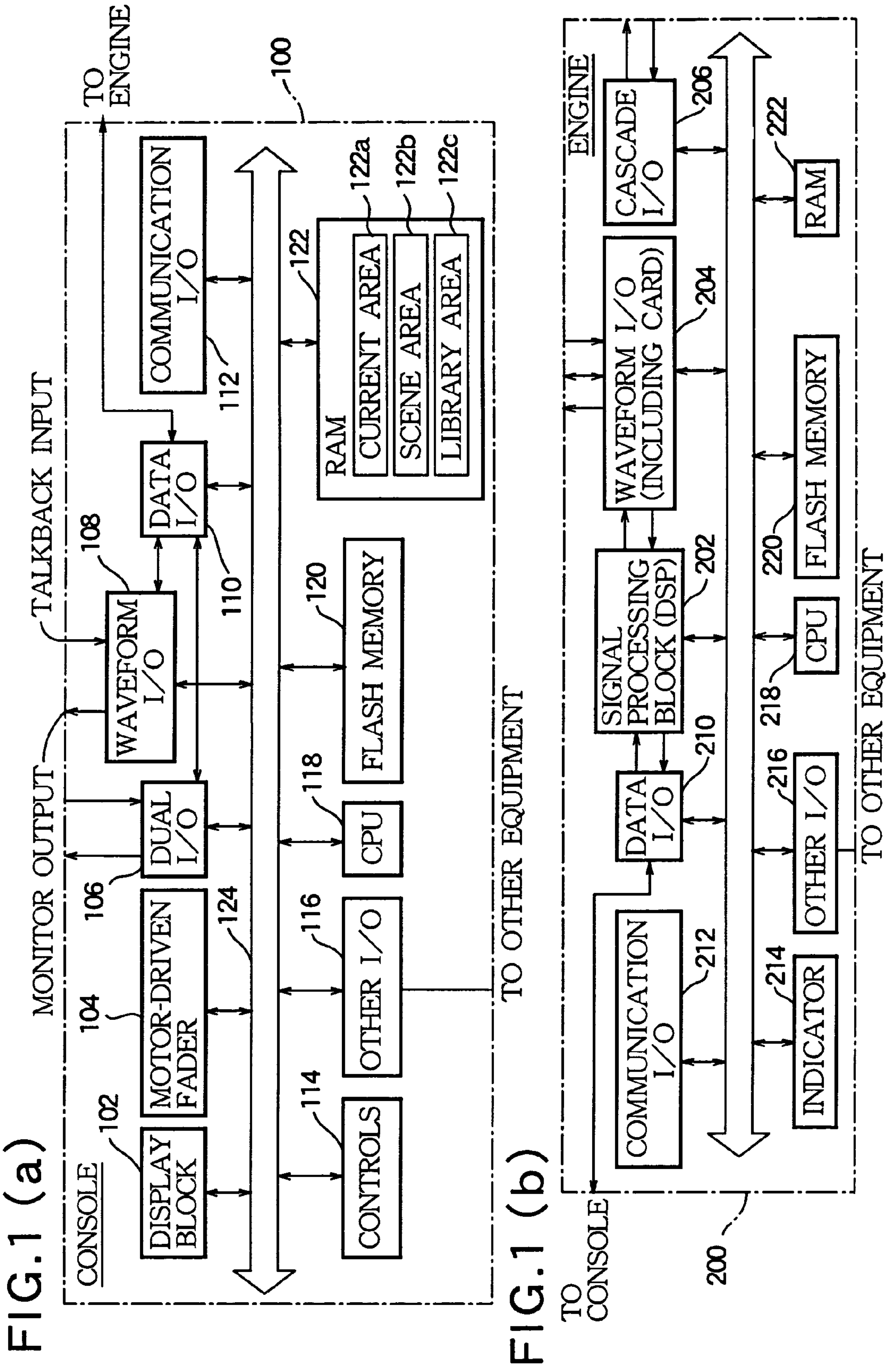
FIGS. 1(*a*) and 1(*b*) are a hard ware block diagram illustrating a console and an engine.

The following describes a digital mixing system practiced as one embodiment of the invention. This embodiment comprises one or more consoles 100 and one or more engines 200. First, the hardware configuration of the console 100 is described with reference to FIG. 1(*a*).

In the figure, reference numeral 102 denotes an indicator, which displays various information for the operator of the console 100 to perform various operations.

Reference numeral 104 denotes motor-driven fader block which is constituted by "48" motor-driven faders. These faders are operated by the operator or automatically if required on the basis of the scene data for example stored in the console 100.

Reference numeral 114 denotes a controls group which is constituted by various controls for adjusting the tone qualities for example of audio signals. These controls are also operated by the operator or automatically if required on the basis of the data for example stored in the console 100. In addition, the controls group 114 also includes a keyboard for entering characters and a mouse for example. On the indicator 102, the mouse cursor corresponding to this mouse is displayed. Reference numeral 106 denotes an dual I/O block, through which the other console is connected when a dual console system (details of which will be described later) is configured, thereby supporting the operations of inputting and outputting digital audio signals and control signals for example with the other console.

Reference numeral 110 denotes a data I/O block for transferring digital audio signals with the engine 200. These digital audio signals include a talkback signal representing operator's voice, a COMM-IN signal representing the voice of the operator of the engine 200, and a monitor signal of the engine 200, for example. Reference numeral 108 denotes a waveform I/O block, which converts a digital audio signal supplied from the engine 200 into an analog signal and coverts a talkback signal (analog) entered via a talkback microphone (not shown) into a digital signal, supplying these converted signals to the data I/O block 110.

Reference numeral 112 denotes a communication I/O block for transferring various control signals with the engine 200. The control signals transmitted from the console 100 include the information about the operations of motor-driven fader block 104 and the controls group 114 for example. On the basis of these pieces of operation information, the parameters for use in the algorithms of the engine 200 are set. Reference numeral 116 denotes other I/O blocks to which various external devices installed on the operator side are connected. Reference numeral 118 denotes a CPU, which controls various other components of the system via a bus 124 on the basis of programs stored in a flash memory 120.

Reference numeral 122 denotes a RAM for use as a work memory for the CPU 118. The following describes the details of the data stored in the RAM 122. In the RAM 122, a current area 122*a*, a scene area 122*b*, and library area 122*c* are allocated. The current area 122*a* stores the current setting states of the mixing console, such as the attenuation of each input channel, the settings of frequency characteristics, the attenuation of each output channel, and the settings of each effect, for example. These data are referred to as "current operation data." Every time these current operation data are updated, the contents of the signal processing by the engine 200 are also updated.

The scene area 122*b* stores plural sets (up to about 1000 sets) of data having the same structure as the current operation data. For example, storing in the scene area 122*b* the contents (or the scene) of the current area 122*a* at a certain point of time allows the reproduction (or recall) of the setting states at that point of time by one-touch operation. These data are referred as "scene data." The library area 122*c* stores a unit library specifying the unit structures in the engine 200, a patch library specifying the connection relationship between input/output patches (to be described later), and a name library specifying the names of input channels. These data are referred to as "library data."

1.2 Engine

The following describes a hardware configuration of the engine 200 used in the mixing system with reference to FIG. 1(*b*). In the figure, reference numeral 202 denotes a signal processing block constituted by a DSP array. The signal processing block 202 can perform mixing process on "96" monaural input channels and output the processing result to "48" monaural output channels. It should be noted that the details of the algorithms of the mixing process executed in the signal processing block 202 ill be described later.

Reference numeral 204 denotes a waveform I/O block which is composed of a plurality of AD converts for converting a microphone-level or line-level analog signal into a digital signal, a plurality of DA converts for converting a digital signal outputted from the signal processing block 202 into an analog signal and supplying it to an amplifier and so on, and a digital input/output block for converting a digital audio signal supplied from external equipment into a digital signal having a predetermined format used in the engine 200 and converting the format of a digital signal in the engine 200 to output the converted format to external equipment.

Reference numeral 206 denotes a cascade I/O block through which the engine 200 is cascaded to other engines, thereby enhancing the processing power of the mixing system (details will be described later). Reference numeral 210 denotes a data I/O block which transfers digital audio signals with the data I/O block 110 of the console 100.

Reference numeral 212 denotes a communication I/O block which transfers control signals with the communication I/O block 112 of the console 100. Reference numeral 214 denotes an indicator for presenting various information to the operator of the engine 200.

Reference numeral 216 denotes other I/O blocks for transferring audio signals and so on with various external devices. Reference numeral 218 denotes a CPU, which controls each block in the engine 200 via a bus 224 on the basis of a control program stored in a flash memory 220. Reference numeral 222 denotes a RAM for use as a work memory of the CPU 218.

1.3 Configuration of the Mixing System 1.3.1 Single-Console System

Figure 2:
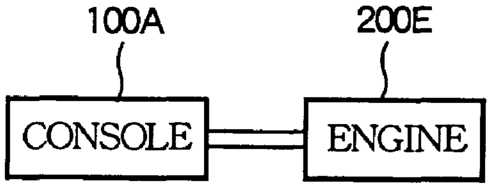
FIGS. 2(*a*) through 2(*d*) are block diagrams illustrating various mixing systems configurable in the above-mentioned embodiment.
Figure 2:
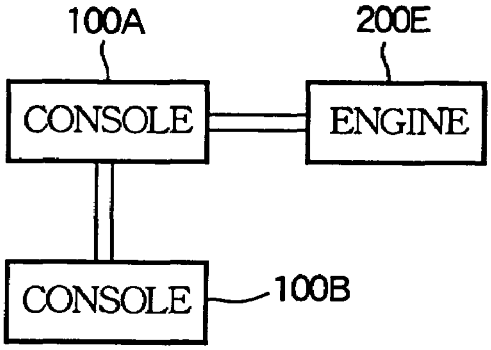
Figure 2:
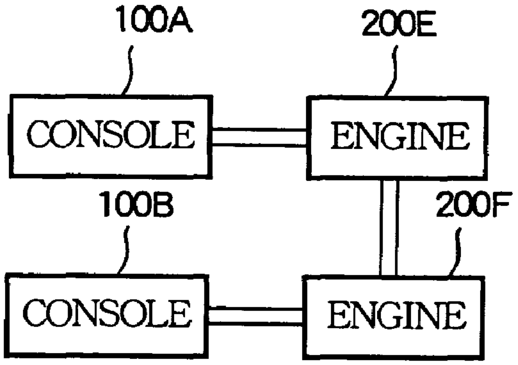
Figure 2:
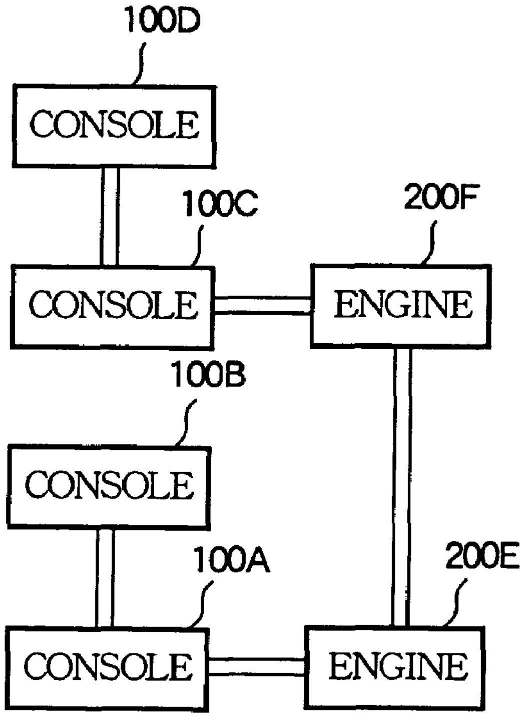

The following describes a configuration of the mixing system which may be constituted by the above-mentioned console 100 and engine 200 with reference to FIGS. 2(*a*) through 2(*d*). First, FIG. 2(*a*) illustrates the configuration of a single-console system constituted by one console 100 and one engine 200. It should be noted that in order to make distinction between a plurality of consoles 100 and a plurality of engines 200 in FIG. 2, each reference numeral is attached with one of alphabets (A, B, C, etc.).

As described above, a console 100A has "48" motor-driven faders and an engine 200E can process "96" input channels. These "96" input channels are divided into the first layer and the second layer; for example, input channel 1 through input channel 48 are allocated to the first layer while input channel 49 through input channel 96 are allocated to the second layer. The controls group 114 includes a layer select switch for selecting one of the layers to be operated by the motor-driven fader block 104.

Therefore, in order to adjust the level for example of input channels, the operator may select the layer to which the input channels to be adjusted belong by operating the layer select switch and then operate the corresponding fader. when the fader is operated, the operation variable (namely, the attenuation) stored at the corresponding position in the current area 122*a* is updated. When the data at the updated position are sent from the console 100 A to the engine 200E, the parameters in the algorithm in the signal processing block 202 are changed, making the fader operation reflect the audio signal to be outputted.

When the operator performs a scene recall operation, the specified scene data are read from the scene area 122*b* to be transferred to the current area 122*a*. This significantly changes the contents of the current operation data. As with the operation of faders for example, the contents of the current operation data updated by the scene recall operation are transmitted from the console 100A to the engine 200E. Consequently, the contents of the recalled scene are reflected in the algorithm in the signal processing block 202.

1.3.2 Dual-Console System

In the above-mentioned single-console system, it is necessary to select one of the layers in accordance with the input channels to be controlled, which, however, is cumbersome for the operator and makes it difficult to simultaneously control the input channels belong to the different layers. To solve these troubles, the present embodiment allows the operator to simultaneously control the monaural "96" input channels by use of two consoles as shown in FIG. 2(*b*). This configuration is referred to as a dual-console system.

In FIG. 2(*b*), "2" consoles 100A and 100B are connected to each other via a dual I/O block 106. The data I/O block 110 and the communication I/O block 112 of the console 100A are connected to the data I/O block 210 and the communication I/O block 212 of the engine 200E respectively.

Thus, the console which is directly connected to the 200E is referred to as a "master console" and the other console is referred to as a "slave console."

The first layer is allocated to the motor-driven fader block 104 of one of these consoles and the second layer is allocated to the motor-driven fader block 104 of the other console, thereby making it practicable to independently allocate the motor-driven fader to each of the "96" input channels. The current area 122*a* of each console constituting the dual-console system stores current operation data as with the single-console system. To be more specific, the current area 122*a* of each console stores the parameters such as attenuation and so on for each of the "96" input channels regardless of the layer allocated to the motor-driven fader block 104 of each console.

In the dual-console system, the contents of the current areas 122*a* of the consoles 100A and 100B are controlled such that these contents become the same. For example, if an operation is performed on one console, the current operation data of that console are updated accordingly. Then, the updated contents are sent to the other console to update the current operation data of the other console in the same manner.

It should be note that the console which eventually sends various parameters to the engine 200E is always the master console 100A. In other words, the parameters in the algorithms in the engine 200E are set in accordance with the current operation data of the console 100A with the current operation data in the console 100B ignored.

Here, consideration must be given to a method of taking actions when a scene recall operation has been performed on one of the consoles. If all of the contents of a scene are transmitted from the console on which a scene recall operation has been performed to the other console, it takes too long for the scene recall operation on both the consoles due to a huge amount of the data to be transmitted. To prevent this problem from happening, the present embodiment transmits only a scene recall operation (namely, the information indicative of which scene has been recalled) between the consoles, the reproduction of an actual scene being executed on the basis of the contents of the scene data in each console. For this reason, the contents of the scene areas 122*b* of the consoles must basically be matched each other beforehand.

1.3.3 Cascading of Single-Console Systems

If the total "96" input channels themselves are not enough in the above-mentioned single-console system, two pairs of console and engine may be arranged as shown in FIG. 2(*c*) to allocate the input channels which are double the input channels provided by a single pair of console and engine. Referring to FIG. 2(*c*), the console 100A is connected to the engine 200E via the I/O blocks 110, 112, 210, and 212. The console 100B is connected to an engine 200F in the same manner.

The engines 200E and 200F are interconnected via the cascade I/O block 206. This connection between the engines 200E and 200F is referred to as a cascade connection. In this configuration, the current operation data in the console 100A and the current operation data in the console 100B are independent from each other, the "96" input channels being controlled in each console. It should be noted that the operator may specify whether or not to link a scene change between both the consoles.

1.3.4 Cascading Dual-Console Systems

It is also practicable to cascade a pair of dual-console systems. An exemplary configuration of this cascading is shown in FIG. 2(*d*). In the figure, the consoles 100A and 100B and the engine 200E form a dual console system as with shown in FIG. 2(*b*). Consoles 100C and 100D and the engine 200F also form a dual-console system. The engines 200E and 200F are interconnected via the cascade I/O block 206.

2. Algorithm Configuration of Embodiment 2.1 Algorithm of Mixing System 2.1.1 Single-Console System The following describes the configuration of the algorithm of the mixing system to be realized by the signal processing block 202 and so on in the single-console system (FIG. 2(*a*)) with reference to FIG. 4. In the figure, reference numeral 232 denotes an analog input block for converting analog audio signals of plural channels into digital signals. Reference numeral 234 denotes a digital input block for converting digital audio signals of plural channels supplied from the outside into the digital signals of a predetermined format used in the engine 200. Each of these input blocks 232 and 234 is realized by the waveform I/O block 204.

Reference numeral 236 denotes an incorporated effecter for performing effect processing on the audio signals of a maximum of "8" channels. Reference numeral 238 denotes an incorporated equalizer for performing equalizing of frequency characteristic for example on the audio signals of a maximum of "24" channels. Reference numeral 242 denotes an input channel adjusting block for adjusting volume and tone quality on a maximum of "96" input channels on the basis of operations done on the console 100A.

Reference numeral 240 denotes an input patch block for allocating the digital audio signal supplied from the above-mentioned input block 232 or 234, the incorporated effecter 236, or the incorporated equalizer 238 to a given channel of the input channel adjusting block 242. It should be noted that a predetermined "1" channel entered from the analog input block 232 is sent to the console 100A as a COMM-IN signal COMM_IN_1 for transmitting the audio signal of the operator of the engine 200E via a monitor system to be described later.

Reference numeral 244 is a mixing bus mixes the digital signals adjusted in volume and tone quality through the input channel adjusting block 242 into a maximum of "48" lines of monaural audio signals. Reference numeral 254 denotes an output channel adjusting block for performing volume and tone quality adjustments on these "48" lines of monaural audio signals. It should be noted that the "48" lines of mixing buses 244 may be paired with the output channels, the mixing of stereo audio signals being performed on each of the paired lines.

Reference numeral 256 denotes a matrix output channel block for further mixing the mixing result of the "48" lines outputted from the output channel adjusting block 254 and outputs a mixing result. In the matrix output channel block 256, "24" monaural lines of audio signals may be mixed. The mixing results of the output channels blocks 254 and 256 are supplied to an output patch block 258.

Reference numeral 260 denotes an analog output block for converting supplied digital audio signals into analog signals. These analog signals are supplied to an amplifier or recording equipment (not shown) for example for sounding in a concert hall, recording, or the like. Reference numeral 262 denotes a digital output block for converting the format of each supplied digital audio signal and supplies the resultant signal to digital recording equipment (not shown) for example. Each of these output blocks 260 and 262 is realized by the waveform I/O block 204.

The output patch block 258 allocates the digital audio signals outputted from the output channel blocks 254 and 256 to given channels in the output blocks 260 and 262.

If required, some of the digital audio signals may be also allocated to the input into the incorporated effecter 236 or the incorporated equalizer 238. Consequently, a result of effect processing/equalizing processing performed on a particular channel may be returned to the input patch block 240 again to use the returned result as the signal of a new input channel.

A talkback signal TG_OUT which represents the voice of one or more operators is inputted in the output patch block 258 via a talkback OUT switch 257. At the time of equipment setting, a talkback signal TB_OUT is sounded in the concert hall via the analog output block 260. This allows the operator to perform acoustic testing in the concert hall by his own voice or broadcast instructions to the personnel working on the stage. At the time of the actual performance of a concert, the talkback OUT switch 257 is kept in the off state, a talkback signal TB-OUT being used for the communication with the personnel on the side of the engine 200E.

Reference numeral 250 denotes a monitor selector for selecting any position in the above-mentioned lines on the basis of the operation done by the operator. Namely, the console 100 has a monitor switch for setting the select state of the monitor selector 250. Reference numeral 252 denotes the other monitor selector. In the single-console system, the operator may set the select states of the monitor selectors 250 and 252 as desired. The signals selected by these selectors 250 and 252 are outputted as a first monitor signal MON1 and a second monitor signal MON2.

In the proximity of each fader of each console, a cue switch is arranged for specifying whether to monitor the digital audio signal corresponding to each fader. Reference numeral 246 denotes a cue bus, which mixes the digital audio signals at the position on which the cue switch is turned on and outputs the mixed signal as a first cue signal CUE1.

It should be noted that, in many cases, the first and second monitor signals MON1 and MON2 are mainly used for monitoring audio signals being broadcast in a concert hall for example and the first cue signal CUE1 is mainly used for monitoring one or more particular input channels or output channels. These signals are sent to the console 100 via a monitor system to be described later.

It should also be noted that, herein, the nomenclature of the signals in the console 100 is different from that of the signals in the engine 200. To be more specific, the signals that can be monitored in the console 100 are "monitor signals MON-A and MON_B" and "cue signal CUE." In the single-console system, the monitor signals MONA and MON_B are equivalent to the first and second monitor signals MON1 and MON2 respectively and the cue signal CUE is equivalent to the first cue signal CUE1.

2.1.2 Dual-Console System

The following describes the configuration of an algorithm to be realized by the signal processing block 202 and so on in the dual-console system (FIG. 2(*b*)). The algorithm in this case is generally the same as the algorithm in the above-mentioned single-console system (FIG. 4) except for the following points.

First, in the dual-console system, a cue bus 248 indicated by dashed lines is arranged in addition to the cue bus 246. In the cue bus 246, a first cue signal CUE1 is synthesized when the cue switch of the master console 100A is operated. In the cue bus 248, a second cue signal CUE2 is synthesized when the cue switch of the slave console 100B is operated.

The first cue signal CUE1 is used as the cue signal CUE in the master console 100A and the second cue signal CUE2 is used as the cue signal CUE in the slave console 100B. Consequently, the operators of he master console 100A and the slave console 100B can monitor the independent cue signals by operating the cue switches of the consoles under their control (if a cue link switch 149 to be described later is off). On the other hand, if one operator operates both the master console 100A and the slave console 100B, the operation of the cue switch on one console is transmitted to the other console when the cue link switch 149 is turned on. Consequently, the signals corresponding to the same cue switch operation are selected as the first cue signal CUE1 and the second cue signal CUE2, thereby allowing the operator to monitor the same cue signal CUE on both the consoles.

In order for the personnel of the engine 200E to independently send audio signals to the operators of the master console 100A and the slave console 100B, predetermined "2" channels inputted from the analog input block 232 are allocated to a COMM-IN signal COMM_IN_1 and a COMM-IN signal COMM_IN_2. On the other hand, the talkback signals from both the master console 100A and the slave console 100B are mixed into a talkback signal TB_OUT, which is supplied to the output patch block 258. In the output patch block 258, the talkback signal TB_OUT is patched so that it is sent to the above-mentioned personnel. For this reason, the present embodiment has only "1" line of the talkback signal TB_OUT even in the dual-console system. The "1" line is obviously economical, but "2" lines may be arranged to separately send the talkback signal to the above-mentioned personnel of both consoles.

The select state of the monitor selector 250 is set only by the monitor switch in the master console 100A and the select state of the monitor selector 252 is set only by the monitor switch in the slave console 100B. The first monitor signal MON1 selected by the monitor selector 250 is supplied to the console 100 as a monitor signal MON_A and to the slave console 100B as a monitor signal MON_B.

Conversely, the second monitor signal MON2 selected by the monitor selector 252 is supplied to the master console 100A as a monitor signal MON-B and to the slave console 100B as a monitor signal MON-A. When viewed from the side of the operator of each of the master console 100A and the slave console 100B, the above-mentioned algorithm is as follows. Namely, when the operator operates the monitor switch on the console under this control, its result is always reflected onto the monitor signal MON-A. When the operator operates the cue switch, its result is always reflected onto the cue signal CUE. Further, the operation of the monitor switch on the other console is reflected onto the monitor signal MON-B.

As described, the present embodiment provides the integrity and compatibility in the operation of the console 100 and the slave console 100B in the dual-console system, while holding the independence in the cue and monitor systems in these consoles. Consequently, the operator errors in the cue and monitor systems may be significantly reduced and, if an operator error occurs on one console, the effects of the error to the operator of the other console may be minimized.

It should be noted that, in the dual-console system, it is also practicable to arrange only one cue bus (only the cue bus 246) by the operator. This is because it is convenient in operation if both the consoles are operated by one operator. Namely, the operator may select "1" or "2" cue signal lines by operating the cue link switch 149 (refer to FIG. 3) to be described later. When "1" is set, all the audio signals generated by operating the cue switch on one of the master or slave consoles are mixed by the cue bus 246 and the mixed signal is supplied to both the consoles as the first and second cue signals CUE1 and CUE2 having the same contents.

2.1.3 Cascading Systems

Figure 4:
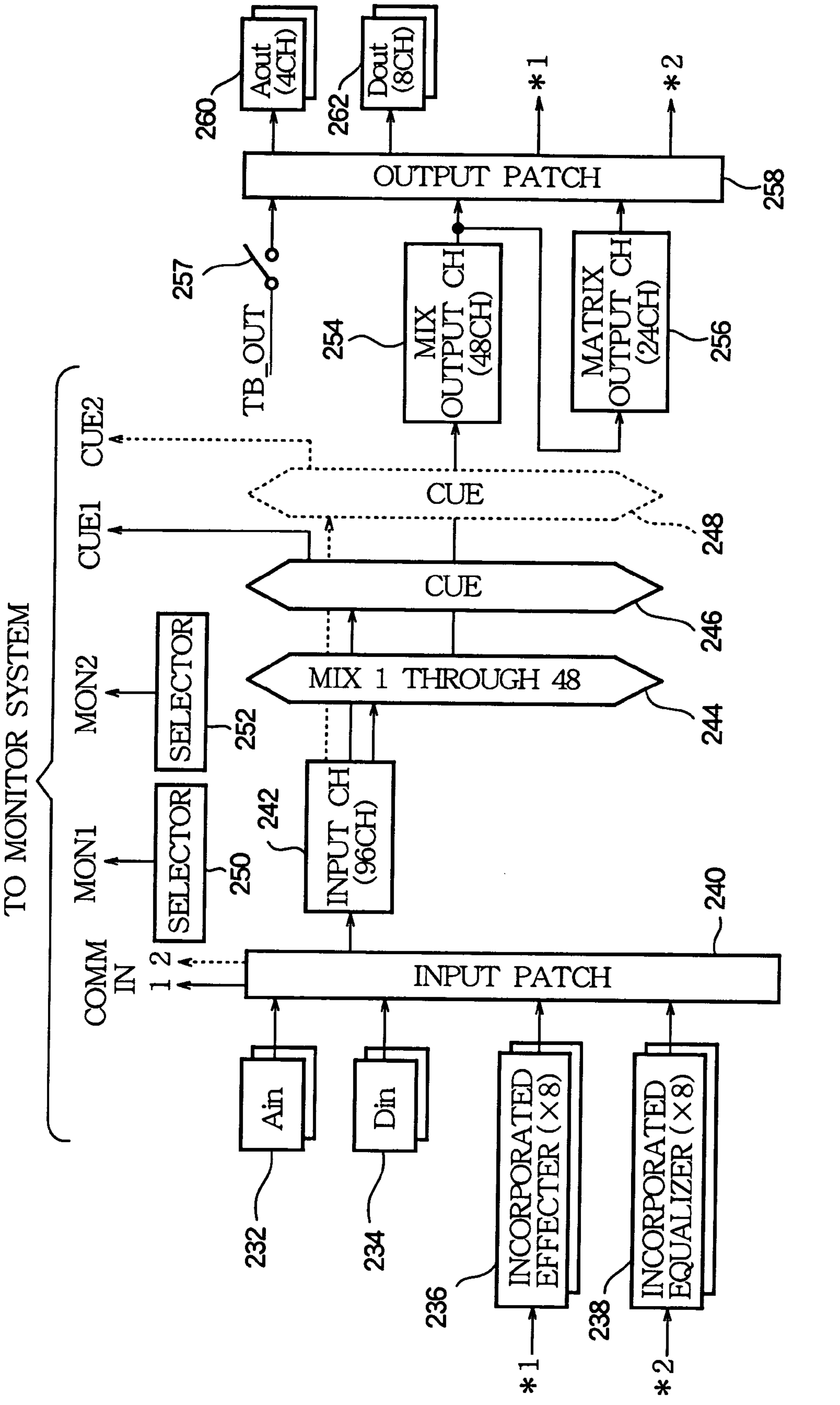
FIG. 4 is a block diagram illustrating a mixing system algorithm implemented by one engine.

The algorithm in the cascading of the engines 200E and 200F of two lines of single-console systems or dual-console systems is equivalent in principle to a configuration in which two lines of the configuration shown in FIG. 4 are arranged with the mixing bus 244 and the cue buses 246 and 248 of both the lines linking with each other. The following describes the details of these bus links with reference to FIG. 5. It should be noted that, in FIG. 5, letter "e" is attached to the reference numeral shown in FIG. 4 of each algorithm part to be executed in the engine 200E and letter "f" is attached to the reference numeral shown in FIG. 4 of each algorithm part to be executed in the engine 200F.

Figure 5:
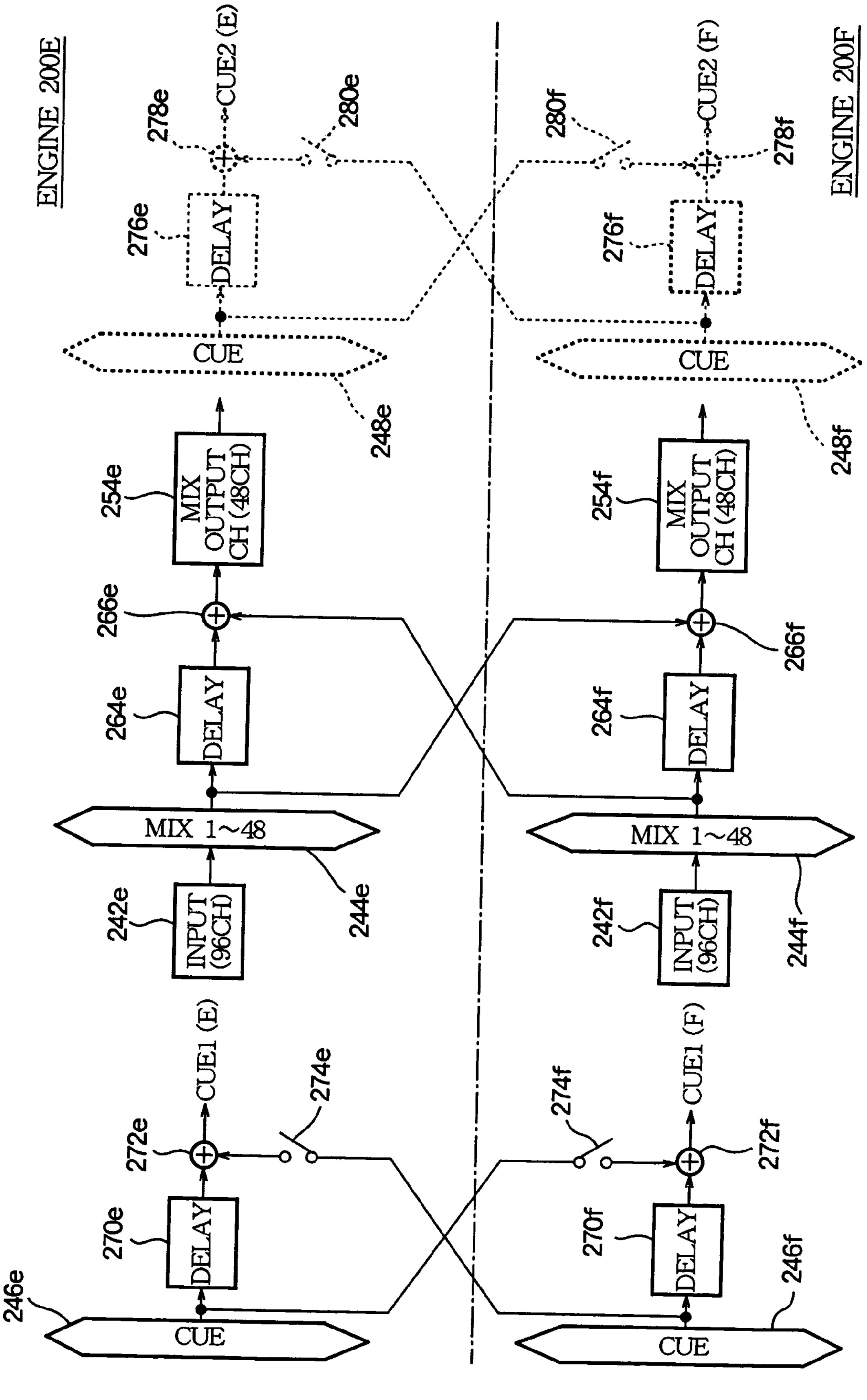
FIG. 5 is a block diagram illustrating the main portion of an algorithm of a mixing system in a cascaded system implemented by two engines.

Referring to FIG. 5, a delay circuit 264*e* and an adder 266*e* are arranged between a mixing bus 244*e* and an output channel adjusting block 254*e* of the engine 200E. Likewise, a delay circuit 264*f* and an adder 266*f* are arranged between a mixing bus 244*f* and an output channel adjusting block 254*f* of the engine 200F. A mixing result obtained in the mixing bus 244*e* is supplied to the adder 266*f* and the mixing result obtained in the mixing bus 244*f* is supplied to the adder 266*e*.

It should be noted that only "1" line of the delay circuits 264*e* and 264*f* and the adders 266*e* and 266*f* is shown, each of which is arranged for each "48×2" mixing channels. Consequently, each signal to be supplied to the output channel adjusting blocks 254*e* and 254*f* are those obtained by mixing the mixing results obtained by the mixing buses 244*e* and 244*f*, the signals to be supplied to the output channel adjusting blocks 254*e* and 254*f* being the same signals in both the engines 200E and 200F. Consequently, at the time of cascading, a mixing system is configured in which the total number of input channels is "192" in the two console systems, which are mixed via "48" buses to be adjusted and outputted by the "48" output channels corresponding to each console.

The output of a cue bus 246*e* of the engine 200E is outputted as a first cue signal CUE1(E) via a delay circuit 270*e* and an adder 272*e* and the output of a cue bus 246*f* is outputted as a first cue signal CUE1(F) via a delay circuit 270*f* and an adder 272*f* of the engine 200F. Then, the mixing result obtained in the 246*e* is supplied to the adder 272*f* via a switch 274*f* and the mixing result obtained in the cue bus 246*f* is supplied to the adder 272*e* via a switch 274*e*.

When the switches 274*e* and 274*f* are turned on, the first cue signals CUE1(E) and CUE1(F) in the engines 200E and 200F become equal to each other; when the switches 274*e* and 274*f* are turned off, the first cue signals CUE1(E) and CUE1 (F) become independent of each other. This is because, when both the consoles of the two cascaded engines are operated by one operator, it is convenient in operation to provide only one line of cue signals and, when the consoles are operated by different operators, it is desirable for each operator to independently select the cue signals. It should be noted that, because the cue bus link configuration is set as shown in FIG. 5, turning on the switches 274*e* and 274*f* allows the both the systems to monitor the cue signal generated by turning on the cue switch of one of the two systems. Also, in this case, the cue switch operation is not linked between the two cascaded systems.

When dual-console systems are cascaded and cue buses 248*e* and 248*f* for the second cue signal CUE2 are formed in both the engines, the same algorithm as mentioned above is set to these cue buses 248*e* and 248*f*. Namely, the output of the cue bus 248*e* of he engine 200E is outputted as a second cue signal CUE2(E) via a delay circuit 276*e* and an adder 278*e* and the output of the cue bus 248*f* of the engine 200F is outputted as a second cue signal CUE2(F) via a delay circuit 276*f* and an adder 278*f*. Then, the mixing result obtained in the cue bus 248*e* is supplied to the adder 278*f* via a switch 280*f* and the mixing result obtained in the cue bus 248*f* is supplied to the adder 278*e* via a switch 280*e*.

It should be noted that the configuration shown in FIG. 5 is characterized by that, while the signal generated in one engine in the cascade connection is delayed by the delay circuit, while the signal received from the other engine is not delayed. For example, the mixing result obtained in the mixing bus 244*e* is supplied to the output channel adjusting block 254*e* of the signal-generating engine via the delay circuit 264*e*, while this mixing result is supplied to the output channel adjusting block 254*f* of the other engine via the adder 266*f* without going through any adder.

This configuration is provided to compensate the transmission delay between the engines 200E and 200F. For example, the mixing result obtained in the mixing bus 244*e* is actually supplied from a 202*e* of the engine 200E to a signal processing block 202*f* via a cascade I/O block 206*e*, a cable, and a cascade I/O block 206*f* of the engine 200F in this order, inevitably generating a transmission delay. If this delay signal is simply mixed with the mixing result obtained in the mixing bus 244, a trouble such as phase lag occurs. To overcome this trouble, a delay time equal to this transmission delay is attached beforehand to the mixing result obtained in the mixing bus 244*f*, thereby obtaining the mixing result free of phase lag for example. To be more specific, "48" mixing results obtained by mixing the mixing results in "48" mixing buses 244*e* and 244*f* by aligning their phases are supplied to the output channel adjusting blocks 254*e* and 254*f* of "48" channels of each console system and each of the mixing results is adjusted by both the console systems in an independent manner before each mixing result is outputted.

2.2 Algorithm of Monitor System 2.2.1 Contents of Algorithm

Figure 6:
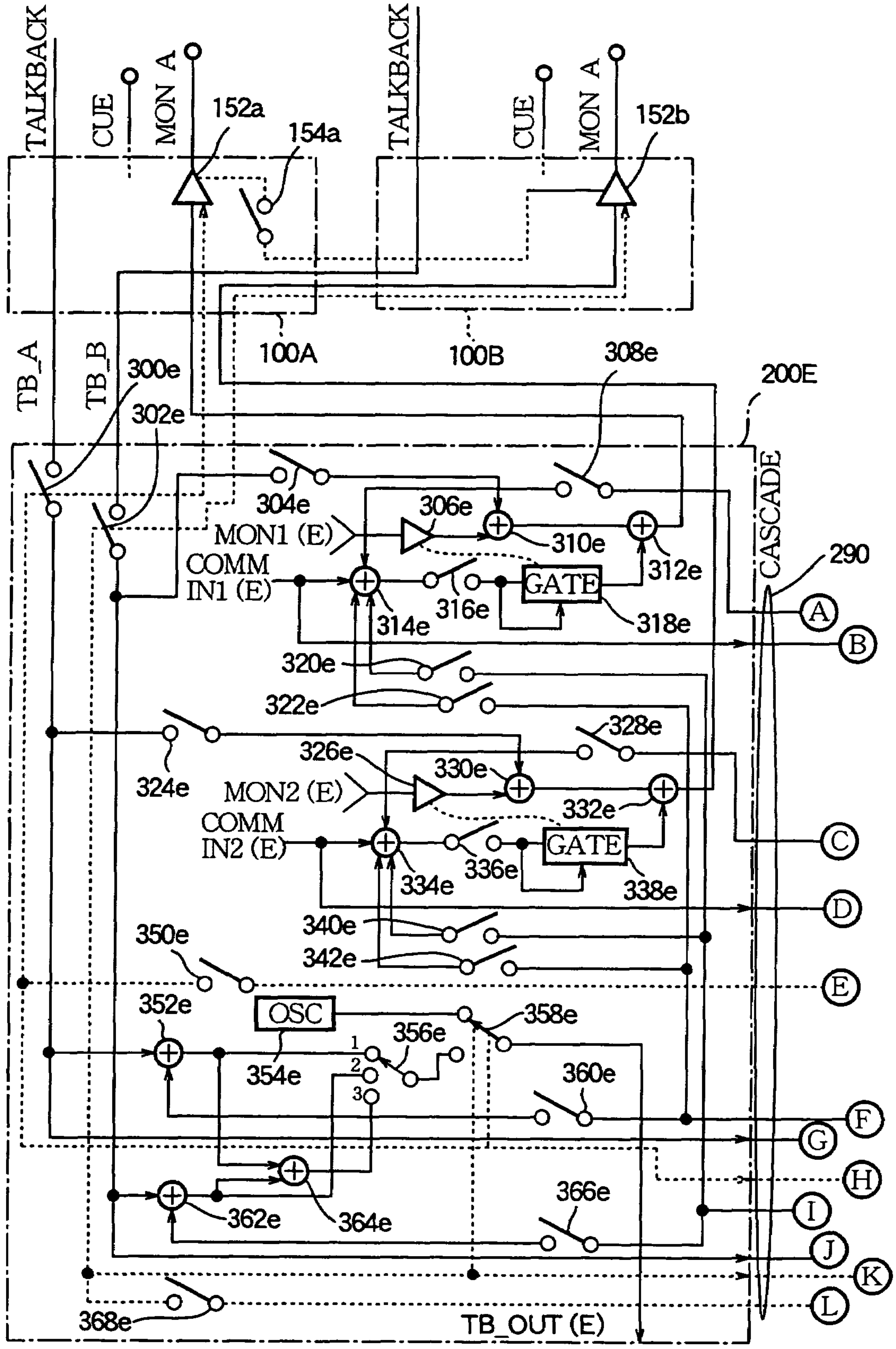
FIG. 6 is a block diagram illustrating an algorithm of a monitor system in the cascading of a dual-console system.
Figure 7:
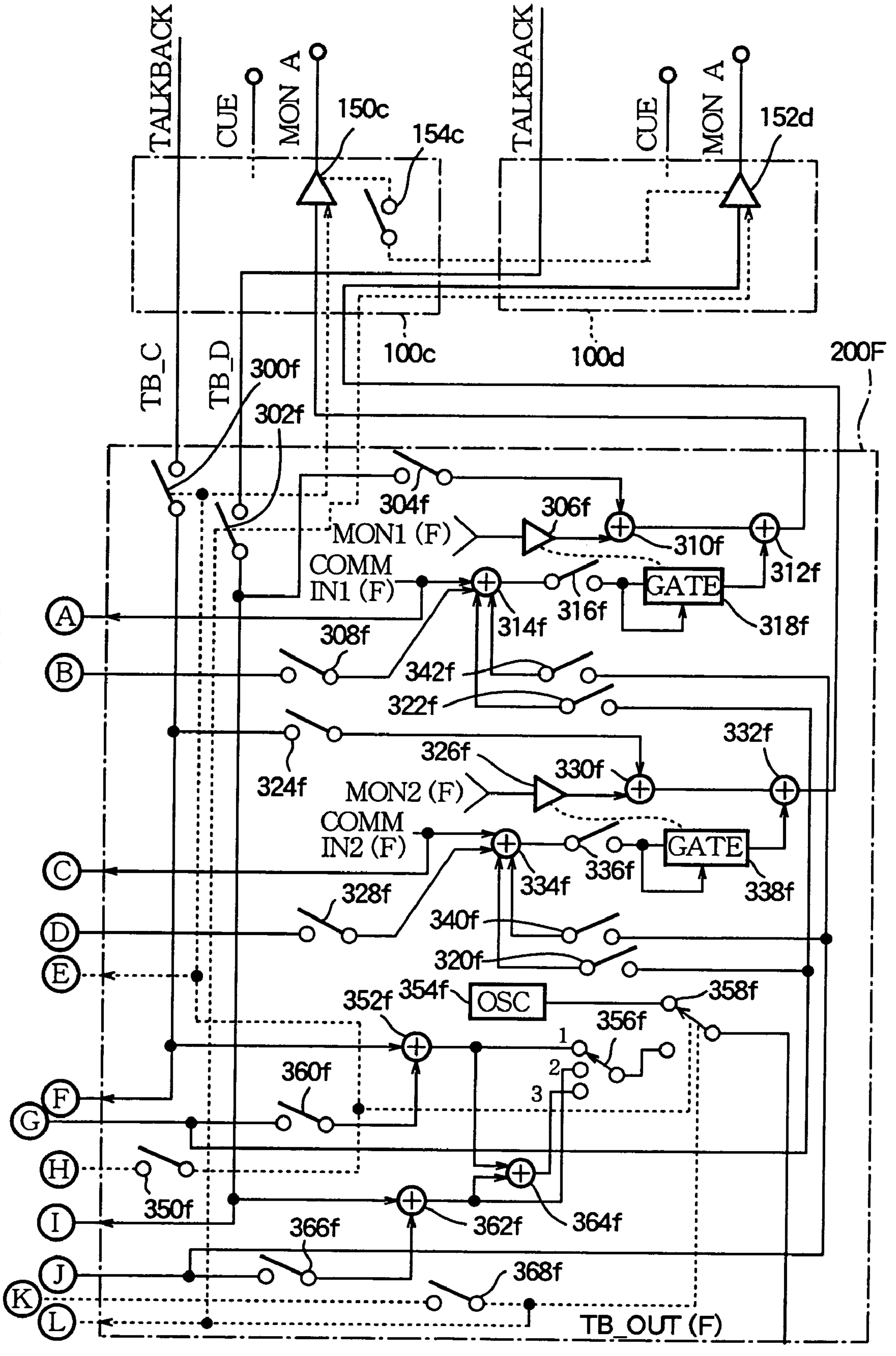
FIG. 7 is a block diagram continued from the block diagram shown in FIG. 6.

The following describes the algorithm of the monitor system of the present invention with reference to FIGS. 6 and 7. It should be noted that the following description uses only an example of the cascade connection of dual-console systems (FIG. 2(*d*)). This is because the monitor system of dual-console system is a system of a maximum scale, so that the unnecessary portions may only be ignored in the other system.

Referring to FIG. 6, reference numerals 300*e* and 302*e* denote talkback switches, which switch between the on and off states of a talkback signals TB-A and TB_B supplied to the engine 200E on the basis of the operated state of an on/off switch (not shown) arranged on each of the consoles 100A and 100B. Inside the consoles 100A and 100B, reference numerals 152*a* and 152*b* denote monitor amplifiers of which gains are adjusted on the basis of the on/off state of input switches 300*e* and 302*e*.

The following describes why the gain adjustment of the monitor amplifiers 152*a* and 152*b* is necessary. If a monitor signal MON_A of each console outputted through the monitor amplifiers 152*a* and 152*b* is sounded from a monitor speaker, the monitor sound may turns around into a talkback microphone, thereby generating noise. To prevent this trouble from happening, the volume of the monitor sound is attenuated in talkback in the monitor amplifiers 152*a* and 152*b*. Such an operation is referred to as "talkback dimmer."

It should be noted that, if the operator monitors a monitor sound through a headphone, no talkback dimmer capability is necessary, so that the operator may specify as desired on the consoles 100A and 100B whether to make the talkback dimmer capability valid and, if it is made valid, the attenuation of monitor sound. On the master console 100A, whether or not to link the talkback dimmer capability of the consoles 100A and 100B is specified by operating the switch 154*a*. For example, if the consoles 100A and 100B are arranged in physical proximity and each operator is monitoring by use of the monitor speaker, the monitor sound of one console may turn around through the talkback microphone of the other console. In such a case, if the talkback dimmer capability is executed on at least one of the consoles, it is preferable to link the talkback dimmer capability so that it is always executed on the other console.

The first monitor signal MON1 outputted from the monitor selector 250 (refer to FIG. 4) is outputted as the monitor signal MON_A of the console 100A via an amplifier 306*e* and adders 310*e* and 312*e* in this order. The talkback signal TB_B outputted through the input switch 302*e* is supplied to the adder 310*e* via a switch 304*e*. Therefore, when the switch 304*e* is turned on, the talkback signal TB_B from the console 100B is mixed with the first monitor signal MON1 and the resultant mixed signal is supplied to the console 100A.

Likewise, the second monitor signal MON2 outputted from the monitor selector 252 is outputted as the monitor signal MON_A of the console 100B via an amplifier 326*e* and adders 330*e* and 332*e* in this order. The talkback signal TB_A outputted via the input switch 300*e* is supplied to adder 330*e* via a switch 324*e*. Therefore, when the switch 324*e* is turned on, the talkback signal TB_A from the console 100A is mixed with the second monitor signal MON2 and the resultant mixed signal is supplied to the console 100B.

Preferably, these switches 304*e* and 324*e* are turned on when the consoles 100A and 100B are physically separated away from each other. Turning on these switches allows the operators of both the consoles to have a conversation with each other by use of the talkback signal and the monitor signal NON_A.

A COMM-IN signal COMM_IN_1(E) in the engine 200 is supplied to a gate circuit 318*e* via an adder 314*e* and a switch 316*e*. Therefore, if the COMM-IN signal need not be heard, the operator may turn off the switch 316*e*. When the level of the supplied COMM-IN signal exceeds a predetermined threshold, the gate circuit 318*e* supplies this COMM-IN signal to the adder 312*e*; if the level of the COMM-IN signal is below the predetermined threshold, the gate circuit 318*e* blocks it.

Consequently, if low-level noise is supplied to the gate circuit 318*e* through the microphone for COMM-IN signal, the noise is not heard by the operator, thereby ensuring uninterrupted monitoring by the operator. On the other hand, if the personnel on the side of the engine 200E enters a COMM-IN signal with a comparatively loud voice, the gate circuit 318*e* gets in a conductive state, thereby mixing the COMM-IN signal COMM_IN_1(E) with the first monitor signal MON1, so that the voice of the personnel can surely be transmitted to the operator of the console 100A.

A talkback signal TB_C of the master console 100C connected to the engine 200F, which is the mate of connection in cascading is supplied to the adder 314*e* via a switch 322*e*, a talkback signal TB_D of the slave console 100D is supplied to the adder 314*e* via a switch 320*e*, and a COMM-IN signal COMM_IN_1(F) in the engine 200F is supplied to the adder 314*e* via a switch 308*e*. Therefore, turning on one or more of the switches 308*e*, 320*e*, and 322*e* mixes the COMM-IN signal COMM_IN_1(F) with the talkback signal TB_D or mixes the talkback signal TB_C with the first monitor signal MON1, the resultant mixed signal being heard by the operator of the console 100A.

It should be noted that the gain of the amplifier 306*e* is linked with the gate circuit 318*e*. Namely, when the gate circuit 318*e* gets in a conductive state, the gain of the amplifier 306*e* automatically lowers. Consequently, the COMM-IN signal can surely be transmitted to the operator without being disturbed by a monitor signal or the like.

Like the above-mentioned configuration, a COMM-IN signal COMM_IN_2(E) is supplied to the adder 332*e* via an adder 334*e*, a switch 336*e*, and a gate circuit 338*e*, so that the COMM-IN signal COMM_IN_2(E) can be mixed with the second monitor signal MON2. Further, the talkback signals TB_C and TC_D of the consoles 100C and 100D and the COMM-IN signal COMM_IN_2(E) of the engine 200F are supplied to the adder 334*e* via the switches 342*e*, 340*e*, and 328*e*, so that turning on these switches mixes the corresponding talkback signal with the second monitor signal MON2, the resultant mixed signal being heard by the operator of the console 100B.

The talkback signal TB-A is supplied to a first input terminal of a switch 356*e* via an adder 352*e*. The talkback signal TB_B is supplied to a second input terminal of the switch 356*e* via an adder 362*e*. Then, the talkback signals TB_A and TB_B are mixed together via the adders 352*e*, 362*e*, and 364*e* to be supplied to a third input terminal of the switch 356*e*. The switch 356*e* selects one of the signals supplied at the first through third input terminals.

Reference numeral 354*e* denotes an oscillator, which outputs sine wave signals and so on for testing the acoustic conditions of a concert hall and so on. The output signal of the oscillator 354*e* or the talkback signal selected by the switch 356*e* is selected by a switch 358*e* and the signal thus selected is outputted as a talkback signal TB_OUT(E) for the engine 200E, which is supplied to the output patch block 258 (refer to FIG. 4) of the engine 200E as described above. It should be noted that it is also practicable to supply the "2" lines of talkback signals TB_OUT to the output patch block 258.

It should be noted that the switching state of the switch 358*e* is automatically set in accordance with the states of the switch 356*e* and the input switches 300*e* and 302*e*. To be more specific, the switch 358*e* is switched to the side of the switch 356*e* when the input switch 300*e* is turned on if the switch 356*e* is set to the first input terminal, when the input switch 302*e* is turned on if the switch 356*e* is set to the second input terminal, and when any one of the input switches 300*e* and 302*e* is turned on if the switch 356 is set to the third input terminal. Otherwise, the switch 358*e* is switched to the side of the oscillator 354*e*.

Consequently, if any one of the talkback signals TB_A and TB_B is outputted via the switch 356*e*, the switch 358*e* is always switched to the side of the switch 356*e*, thereby mixing the talkback signal TB_OUT with at least one of the talkback signals TB_A and TB_B. To the adder 352*e*, the talkback signal TB_C is supplied via the switch 360*e*. To the adder 362*e*, the talkback signal TB_D is supplied via the switch 366*e*. Therefore, turning on one or both of the switches 360*e* and 366*e* can output the talkback signal TB_OUT (E) obtained by mixing the talkback signals TB_C and TB_D.

Reference numerals 350*e* and 368*e* denote switches for controlling talkback dimmer linking. If the talkback dimmer capability is executed on the master console 100C of the engine 200F, turning on the switch 350*e* also executes the talkback dimmer capability on the master console 100A of the engine 200E in a linked manner. If the talkback dimmer capability is executed on the slave console 100D of the engine 200F, turning on the switch 368*e* also executes the talkback dimmer capability on the slave console 100B of the engine 200E in a linked manner.

In the above, the algorithm of the monitor system to be executed in the consoles 100A and 100B and the engine 200E has been mainly described with reference to FIG. 6. A similar algorithm is executed in the consoles 100C and 100D and the engine 200F. The contents of this algorithm are shown in FIG. 7. With reference to FIG. 7, components similar to those previous described with reference to FIG. 6 are denoted by the same reference numerals except that suffixes "a", "b", and "e" are replaced with "c", "d", and "f" respectively. It should be note that the switches associated with the talk path between consoles 100A and 100D are referenced by 320*e* and 320*f* and the switches associated with the talk path between the consoles 100B and 100C are referenced by 342*e* and 342*f*.

None of a pair of switches 154*a* and 154*c*, a pair of switches 304*e* and 304*f*, and a pair of switches 324*e* and 324*f* does not operate in a linked manner. This is because it is preferable for each of these switches to be independently set in accordance with the physical installation conditions of the two consoles constituting a dual-console system.

On the other hand, a pair of switches 308*e* and 308*f*, a pair of switches 320*e* and 302*f*, a pair of switches 322*e* and 322*f*, a pair of switches 328*e* and 328*f*, a pair of switches 340*e* and 340*f*, and a pair of switches 342*e* and 342*f*, a pair of switches 350*e* and 350*f*, a pair of switches 360*e* and 360*f*, a pair of switches 366*e* and 366*f*, and a pair of switches 368*e* and 368*f* each operate in a linked manner. It should be noted that the on/off states of these switches may be controlled from the corresponding consoles.

If the talkback signal of the mate of the cascade connection is outputted via the switch 356*e* when the switches 360*e* and 360*f* or the switches 366*e* and 366*f* are turned on, the switch 358*e* is automatically switched to the side of the switch 356*e*.

For example, when the switches 360*e* and 360*f* are turned on and the contact of the switch 356*e* is set to the first or third input terminal, the switch 358*e* is automatically switched to the side of the switch 356*e* when the input switch 300*f* for the talkback signal TB_C is turned on.

Likewise, when the switches 366*e* and 366*f* are turned on and the contact of the switch 356*e* is set to the second or third input terminal, the switch 358*e* is automatically switched to the side of the switch 356*e* when the input switch 302*f* for the talkback signal TB_D is turned on. The same operation as above is also executed in the engine 200F.

2.2.2 Setting of Algorithm According to Mixer Arrangement

Figure 8:
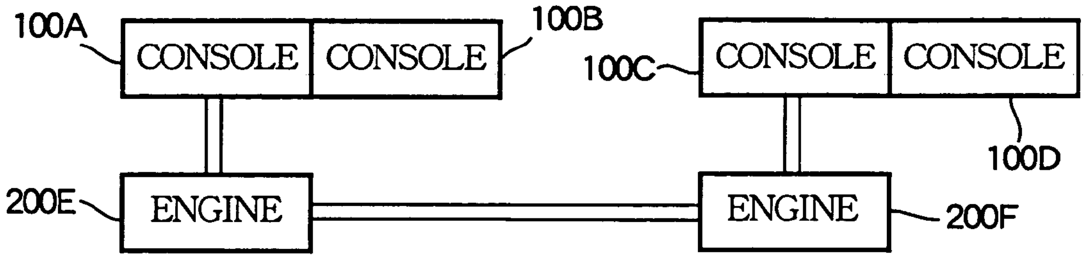
FIGS. 8(*a*) through 8(*e*) are diagrams illustrating exemplary physical arrangements of consoles.
Figure 8:
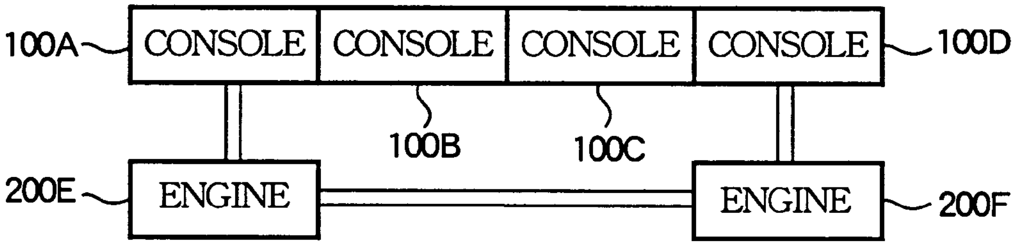
Figure 8:
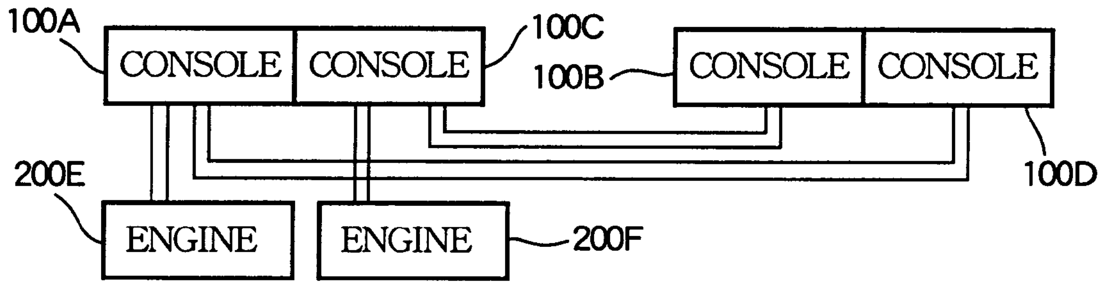
Figure 8:
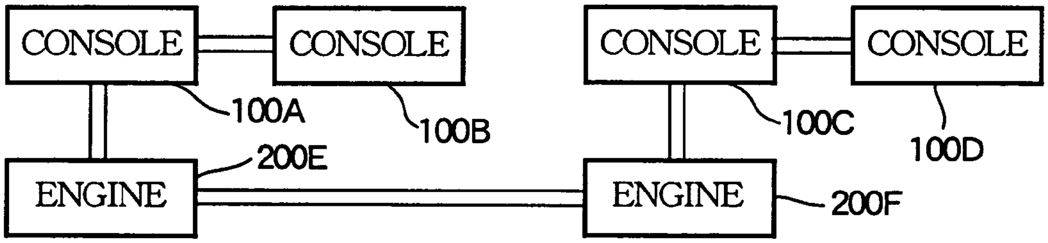
Figure 8:
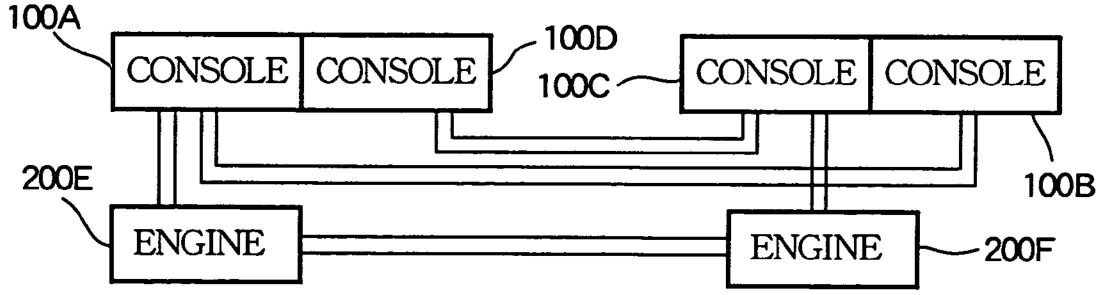

The following describes the relationship between console arrangements the preferable setting of each of the above-mentioned switches with reference to FIGS. 8(*a*) through (*e*). First, an arrangement is possible in which the consoles 100A and 100B forming one group of a cascade connection (cascade group) are brought into proximity, the consoles 100C and 100D forming the other cascade group are brought into proximity and these cascade groups are separated away from each other as shown in FIG. 8(*a*). It is also possible to provide an arrangement in which all consoles 100A through 100D are brought into proximity as shown in FIG. 8(*b*).

As shown in FIG. 8(*c*), the consoles 100A and 100C, which are the master of the cascade groups, are brought into proximity, the consoles 100B and 100D, which are the slave of the cascade groups, are brought into proximity, and the master console group and the slave console group are separated away from each other. Further, an arrangement is possible in which all the consoles are separated away from each other as shown in FIG. 8(*d*). In addition, an arrangement is possible in which the consoles 100A and 100D are brought into proximity and the consoles 100B and 100C are brought into proximity as shown in FIG. 8(*e*).

In the example shown in FIG. 8(*a*), the switches 154*a* and 154*c* may be both turned on to link the talkback dimmers of both cascade groups. In addition, the switches 304*e*, 304*f*, 324*e* and 324*f* may be turned off to allow the operators in proximity to directly converse with each other without the intermediary of the system.

The switches 350*e*, 350*f*, 368*e*, and 368*f* may be turned off to prevent a talkback dimmer from being caused by the separated consoles. It is desirable to allocate a talk path between the separated consoles by turning on the switches 322*e*, 322*f*, 320*e*, 320*f*, 342*e*, 342*f*, 340*e*, and 340*f*. In addition, turning on the switches 360*e*, 360*f*, 366*e*, and 366*f* allows the mixing of the talkback signal TB_OUT of one engine with the talkback signal of the other engine, thereby integrating the talkback signals.

If all consoles 100A through 100D are arranged in proximity as shown in FIG. 8(*b*), the switches 154*a* and 154*c* may be turned on and the switches 304*e*, 304*f*, 324*e*, and 324*f* may be turned off. It is preferable, however, to turn on the switches 320*e*, 320*f*, 342*e*, and 342*f*, thereby allocating a talk path between the consoles 100A and 100D, which are less separated away from each other than in the other arrangements.

In the other arrangements, it is preferable to determine the on/off states of each switch on the basis of the same concept as above. To be more specific, it is preferable for the consoles arranged in proximity to link the talkback dimmer capability between them and for the switches associated with this talk path to be turned off. It is preferable for the consoles separated away from each other to execute the talkback capability independently and form a talk path based on talkback signals.

2.3 Configuration of Operator Controls on Consoles

The controls group 114 on the console 100 has controls for various status settings like ordinary mixing consoles. Of these controls, the following describes the configuration of ones that are associated with the above-mentioned mixing system and monitor system with reference to FIG. 3.

In the figure, reference numeral 132 denotes a cascade-off switch. When this switch is pressed, the engines are de-cascaded (the connection indicated by dot-and-dash lines in FIG. 5 and the connection of the cascade cables in FIG. 6). Reference numeral 134 denotes a cascade master switch. When this switch is pressed, the engine of the cascade group to which the console concerned belongs is set to the cascade master.

Reference numeral 136 denotes a cascade slave switch. When this switch is pressed, the engine of the cascade group to which the console concerned belongs is set to the cascade slave. The above-mentioned switches 132, 134, and 136 are valid throughout the consoles. For example, In a dual-console cascade system, the cascade mode may be switched for any of the consoles 100A through 100D.

Reference numeral 138 denotes a talkback link switch, which switches between the on/off states of the link of the talkback signals of the two cascaded console systems. When the talkback link switch 138 in the console 100A is operated, the on/off states of the switches 360*e* and 360*f* are switched between. When the talkback link switch 138 of the console 100B is operated, the on/off states of the switches 366*e* and 266*f* are switched between.

Reference numeral 139 denotes a talkback-to-monitor B switch. The talkback-to-monitor B switch 139 arranged on one console specifies whether the talkback signal of this console is to be mixed with the monitor signal MON_A of the other console in the dual console system (or the monitor signal MON_B when viewed from this console on which the talkback-to-monitor B switch 139 is arranged). For example, when the talkback-to-monitor B switch 139 on the console 100 is operated, the on/off states of the switch 324*e* is switched between and, when the talkback-to-monitor B switch 139 on the console B is operated, the on/off states of the switch 304*e* is switched between.

Reference numeral 140 denotes COMM-IN link switch. When this switch is pressed on the consoles 100A through 100D, the on/off states of the switches 308*e*, 328*e*, 308*f*, and 328*f* are switched between. To be more specific, when the COMM-IN link switch 140 on the console 100A is operated, the on/off states of the switches 308*e* and 308*f* are switched between and, when the COMM-IN link switch 140 on the console B is operated, the on/off states of the switches 328*e* and 328*f* are switched between.

Reference numerals 142 and 143 denote cascade talkback to comm-in switch, which specifies whether the talkback signal from the console of the mate cascade group is to be linked with the COMM-IN signal of one console on which these switches 142 and 143 are arranged. For example, when the switch 142 is turned on in the console 100A, the switch 322*e* is turned on and the switch 322*f* is also turned on in a linked manner, thereby enabling the talk between the consoles 100A and 100C.

When the switch 143 is turned on in the console 100A, the switch 320*e* is turned on and, in response, the switch 320*f* is also turned on, thereby enabling the talk between the consoles 100A and 100D. Likewise, when the switches 142 and 143 on the console 100B are operated, the on/off states of the switches 342*e* and 340*e* are switched between and, in response, the on/off states of the switches 342*f* and 340*f* are switched between.

Reference numeral 144 denotes a VCA link switch. Every time this switch is pressed, the on/off states of the VCA link between the cascade groups is switched between. The following briefly describes the VCA. Because a fader is allocated to each of plural input channels in the mixing system, the volumes level of each input channel may be set as desired by operating its fader. However, if these input channels carry signals associated with each other, it would be convenient if the volume levels of all input channels may be adjusted in a linked manner by operating only one fader.

Therefore, in addition to the faders corresponding to the plural input channels, a common fader for adjusting the volume levels of these input channels in a linked manner may be arranged. This is known as VCA and the common fader allocated to the plural input channels is referred to as a VCA fader. The VCA settings include the validating/invalidating of each VCA fader and the states of allocating input channels to each VCA fader. When VCA is linked, these settings are made common throughout both the cascade groups.

Reference numeral 146 denotes a cue link switch, which is used to set whether or not to execute cue link with the corresponding console in the mate cascade group. In the above-mentioned system in which dual consoles are cascaded, the cue link switch 146 of the consoles 100A and 100C switches between the on/off states of the switches 274*e* and 274*f* (refer to FIG. 5) in a linked manner and the cue link switch 146 of the consoles 100B and 100D switches between the on/off states of the switches 280*e* and 280*f* in a linked manner.

Reference numeral 148 denotes a scene link switch, which is used to set whether or not to link scene recall between the cascade groups. It should be noted that the scene link switch 148 is valid in each of the consoles 100A through 100D. Reference numeral 149 is a cue link switch, which is used to set whether or not to link a cue operation between the two consoles in the dual-console system. It should be noted that the cue link switch 149 is valid in each of the master and slave consoles.

Figure 9:
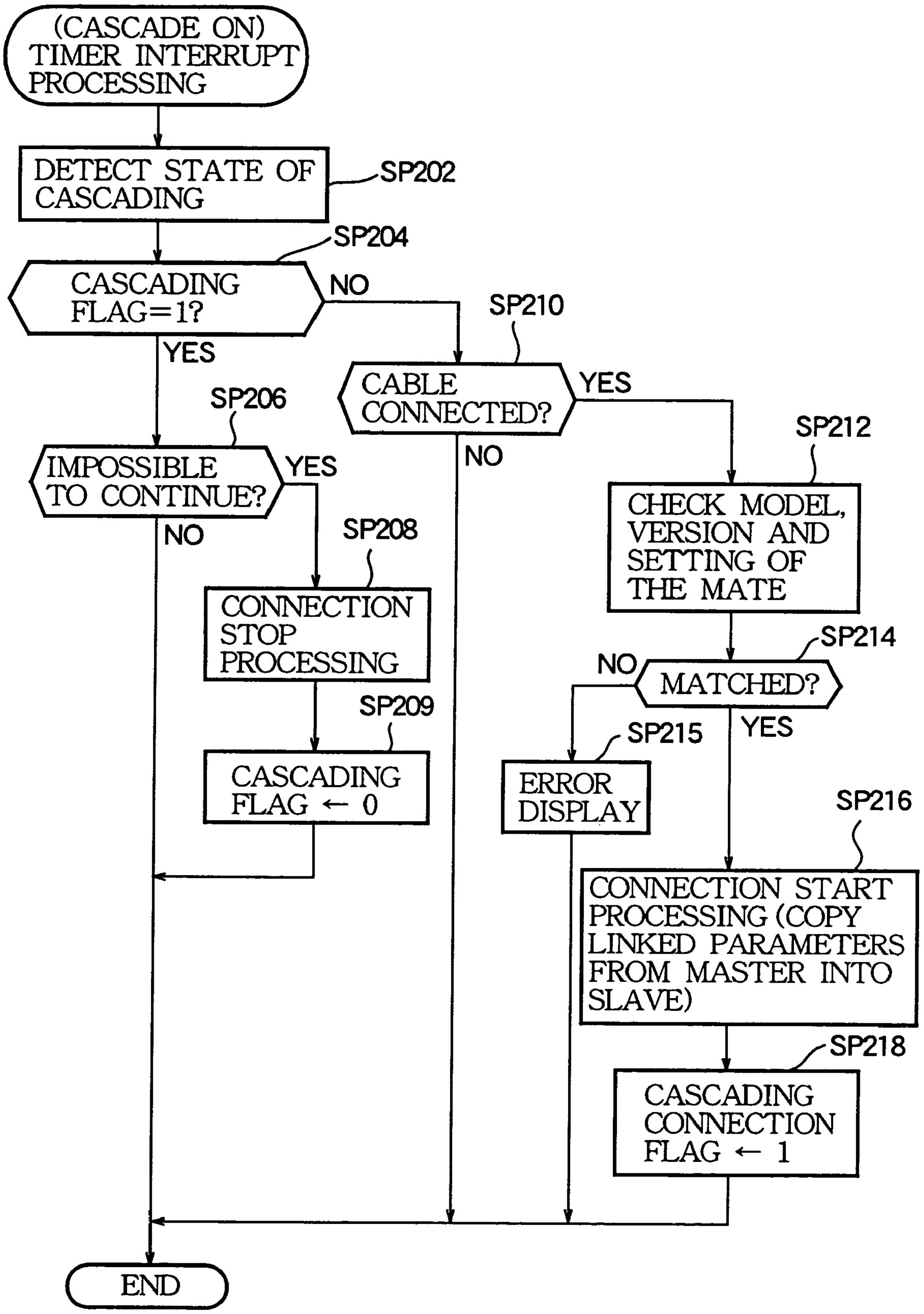
FIG. 9 is a flowchart describing a timer interrupt processing routine executed in a master console.

3. Operations of Embodiment 3.1 Operations Associated with Cascading 3.1.1 Timer Interrupt Processing If, in a console (the master console in a dual-console system) connected to each engine, the engine is cascaded with the cascade mater or the cascade slave, a timer interrupt processing routine shown in FIG. 9 is started by the CPU 118 at predetermined time intervals.

In the figure, in step SP202, the timer interrupt processing routine detects whether the other engine is connected via the cascade I/O block 206 of this engine. In step SP204, the interrupt timer routine determines whether "cascading flag" stored in the RAM 122 is "1" or not. It should be noted that the cascading flag is reset to "0" when the engine 200 is connected and set to "1" when the other engine is later cascaded with this engine.

If the cascading flag is "0", then the routine determines "NO" in step SP 204 and then goes to step SP210. In this step, the routine determines whether the other engine is physically connected via the cascade I/O block 206. If the decision is "YES", the routine goes to step SP212 to recognize the model, version, and setting state of the other engine. The version denotes the version of the firmware stored in the flash memory 220 and the setting state denotes "cascade master," "cascade slave," or "cascade off."

For example, is the own engine is set to the cascade master, the mate engine must always be set to the cascade slave and vice versa. Next, in step S214, the routine determines on the basis of the result of the checking in step SP212 whether the own engine and the mate engine are compatible with cascading. Namely, for cascading, both engines must be the same in model and firmware version and one of the engines must be set to the cascade master and the other to the cascade slave.

If these conditions are met, the decision is "YES", upon which the routine goes to step SP216, in which the processing for connecting both engines start. To be more specific, first, the linked parameters (for example, VCA settings and so on) are copied from the console of the cascade master into the console of the cascade slave. Next, in step SP216, the algorithms of the mixing system and the monitor system are changed. The following describes the details of this operation by use of the case of the cascaded system of dual consoles (FIG. 2(*d*)) for example.

First, before the execution of step SP216, the algorithm (refer to FIG. 4) of the independent mixing system was configured in each of the engines 200E and 200F. For this configuration, the algorithms for the portions associated with the mixing bus and the cue bus are changed as shown in FIG. 5. Namely, the mixing buses 244*e* and 244*f* are interlinked and the cue buses 246*e* and 246*f* or the cue buses 248*e* and 248*f* also become linkable or de-linked on the basis of the on/off states of the switches 274*e* and 274*f* and the switches 280*e* and 280*f*.

Before the execution of step SP216 for the monitor system, the algorithms of the monitor system shown in FIGS. 6 and 7 were formed in each engine, but it was regarded that no signal exists between the cascade groups. In other words, it was regarded that the level of each signal passing over the cascade cable 290 is "0". However, the execution of step SP216 allows the transfer of the signals of the monitor system to mix, in each console, the talkback signal and so on in the cascade group with the COMM-IN signal and so on.

It should be noted that the processing to be executed by this routine is the processing for setting the algorithms of the engine of the own side. If this routine is executed in the console 100A, only the algorithms of the engine 200E are set. On the other hand, the same routine is executed in the console 100C in the other cascade group, so that the algorithms on the side of the engine 200F are set. When the processing of step SP216 has been completed for both the master consoles, the reconstruction of the algorithms in the engines 200E and 200F is completed. When the processing of step SP216 has been completed, the routine goes to step SP218, in which the cascading flag is set to "1".

It should be noted that, if the decision in step SP210 is "NO", this timer interrupt processing comes to an end without executing any substantial processing. If the decision is "NO" in step SP214, then this routine goes to step SP215, in which a predetermined error display is performed on the indicator 214 of the engine concerned. In this error display, the failure of the cascading and its reason (the mismatch in model or version or the contradiction in setting) are displayed. In addition, the console connected to this engine is notified of the occurrence of error, displaying the error information on the indicator 102 of this console.

When the timer interrupt processing routine (FIG. 9) is started again after the cascading flag is set to "1", the routine goes to step SP206 via steps SP202 and 204. In this step, the routine determines whether it is impossible to continue the cascading. For example, if the cable connecting both engines is disconnected by failure or the cascade mode of the engines 200E and 200F is set to the state in which cascading is disabled (for example, both engines are the cascade masters), the above-mentioned error is reported.

If the decision is "YES" in step SP206, the routine goes to step SP208 to execute connection stop processing. Namely, the algorithms of the mixing system and the monitor system return to the state as it was before the above-mentioned execution of step SP216. Next, in step SP209, the cascading flag is set to "0", upon which this routine exits.

3.1.2 Scene Recall Processing

Figure 10:
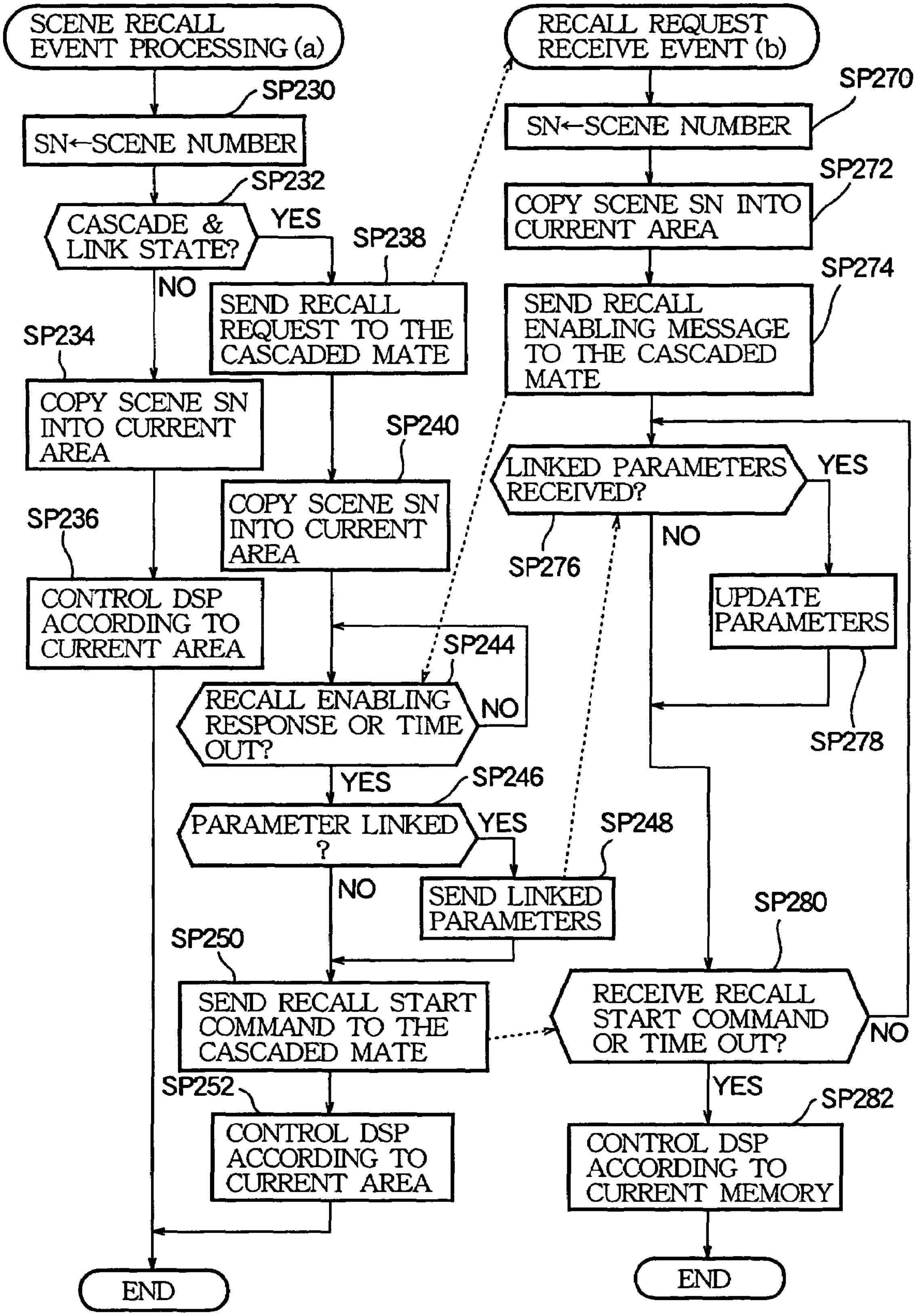
FIG. 10 is a flowchart describing a scene recall event processing routine and a recall request receive event processing routine.

When a scene recall operation is performed on any of the consoles, a scene recall event processing routine shown in FIG. 10(*a*) is started on that console. It should be noted that the following mainly describes the operations in the single-console system and the operations in the dual-console system will be described later.

In the figure, in step SP230, the scene number of a recalled scene is substituted into variable SN. Next, in step SP232, the engine corresponding to the console concerned is cascaded with the other engine and this routine determines whether the scene recall operation is linked in this cascading. If the decision is "NO", then the routine goes to step SP234.

In this step, a portion associated with this scene number SN among the contents of the scene area 122*b* in the console concerned is copied into the current area 122*a* as current operation data. Next, in step SP236, on the basis of this current operation data, the parameters and so on of the algorithm of the signal processing block 202 of the corresponding engine are set again. This setting reproduces the contents of the scene number SN by the engine concerned alone, upon which this scene recall event processing routine exits.

On the other hand, if the decision is "YES" in step SP232, then the routine goes to step SP238, in which the scene number SN and a recall request are transmitted to the consoles belonging to the mate cascade group. In what follows, the case in which a scene recall operation occurs in the console 100A in the dual-console cascaded system will be described for example. When a scene recall operation occurs, the scene number SN and a recall request are transmitted to the consoles 100C and 100D belonging to the mate cascade group.

In step S240, the contents of the scene number SN in the scene area 122*b* are copied into the current area 122*a* as new current operation data in the console 100A. Next, in step S244, the routine receives "link-enabled response" from both consoles 100C and 100D of the mate group or determines whether a time-out has occurred (or a predetermined time has passed after the end of step SP240). If the decision is "NO", the routine repeats the processing of step SP244.

On the other hand, if a recall request is transmitted from the console 100A to the consoles 100C and 100D in step SP238, a recall request receive event processing routine shown in FIG. 10(*b*) is started in each of the consoles 100C and 100D. In step SP270, the transmitted scene number is substituted into variable SN. Next, in step SP272, the scene data having scene number SN are copied into the current area 122*a* in each of the consoles 100C and 100D.

Next, in step SP274, a recall enabling response is transmitted to the console 100A (on which the scene recall operation has occurred), which is the mate of the cascading. In step S276, the recall request receive event processing routine determines whether the linked parameters have been received from the mate. If the decision is "NO", the routine goes to step SP280 to receive a recall start command from the mate or determines whether a time-out has occurred (a predetermined time has passed after the end of step SP274). If the decision is "NO", the routine returns to step SP276.

Consequently, the routine repeated executes steps SP276 and SP280 in the consoles 100C and 100D until the parameters or the recall start command is supplied from the console 100A. On the other hand, when the above-mentioned step SP274 has been executed on both the consoles 100C and 100D, the recall enabling responses from both being received by the console 100A, the decision in step SP244 in FIG. 10(*a*) is "YES", upon which the scene recall event processing routine goes to step SP246.

In step SP246, the scene recall event processing routine determines whether there are the linked parameters. If the decision is "YES", this routine goes to step SP248 to transmit the linked parameters to the consoles 100C and 100D. It should be noted that "parameters" herein are those parameters which belong to the scene number SN. For example, assume that "VCA" be linked in both the cascade groups and the state of the VCA associated with this scene number NS have been changed in any of the cascade groups.

In such a case, the setting data associated with the VCA concerned are transferred from the console 100A on which this scene recall operation has occurred to the consoles 100C and 100D. When the linked parameters are received by the console 100C or 100D, the decision is "YES" on the receiving console in step SP276 every time the parameters are received and step SP278 is executed. Namely, in accordance with the received parameters, the current operation data are sequentially updated.

As described, one of the characteristics of the present embodiment lies in that, when a scene recall operation occurs on any of the consoles, the linked parameters are transmitted from "the console on which an operation has occurred" to "the other console." To be more specific, in the above-mentioned timer interrupt processing routine (FIG. 9), the parameters are always transmitted from "the console on the cascade master side" to "the console on the cascade slave side"; however, once the cascading has been established, the linked parameters may be edited on the console of any of the cascade master and the cascade slave. This allows the operator on each console to reflect, onto the other console, the settings of the linked parameters of console of his own by performing a scene recall operation.

In the console 100A, the scene recall event processing routines goes to step SP250 after the transmission of all linked parameters. In this step, a recall start command is transmitted to the consoles 100C and 100D. Next, in step SP252, the parameters of the algorithm of the signal processing block 202 of the engine 200E are controlled such that the parameters match the contents of the current area 122*a*. Consequently, the processing in the console 100A on which the scene recall operation has occurred comes to an end.

On the other hand, in the consoles 100C and 100D, when the recall start command is received, the decision is "YES" in step SP280, upon which the recall request receive event routine goes to step SP282. In this step, the parameters of the algorithm of the signal processing block 202 of the engine 200F are controlled such that the parameters match the contents of the current area 122*a* of the console 100C or 100D.

As described, in the present embodiment, if a scene recall operation occurs on one of the consoles with a scene linked at the time of cascading, the scene recall operation is reflected onto all associated engines almost at the same time (steps SP252, SP282). Consequently, if another processing operation that cannot be discontinued is being executed on the console or engine that received a recall request for example, a trouble in which there occurs an offset between the scene recall timings for the consoles and engines may be prevented beforehand from being caused.

It should be noted that, in step SP244 or SP280, the decision for time-out is also executed, so that, if the console which has transmitted or received a recall request for example cannot make a response to the request for a comparatively long time, the other console may independently change scenes.

3.2 Operations Associated with Dual-Console System 3.2.1 Timer Interrupt Processing in Console Each of the consoles is set to one of the operation modes "dual-console off," "dual-console master," and "dual-console slave." These operation modes correspond to "master console of single-console system," "master console of dual-console system," and "slave console of dual-console system." In other words, the operator sets each operation mode in accordance with the operation state into which the operator desires to put each console.

If "dual-console off" is selected as the operation mode, the operation state of the console concerned is always set to "master console of single-console system." It should be noted that, if the master console or slave console of a dual-console system is selected as the operation mode, the actual operation state of the console is determined in accordance with the operation of the console concerned and its actual connection state.

Figure 11:
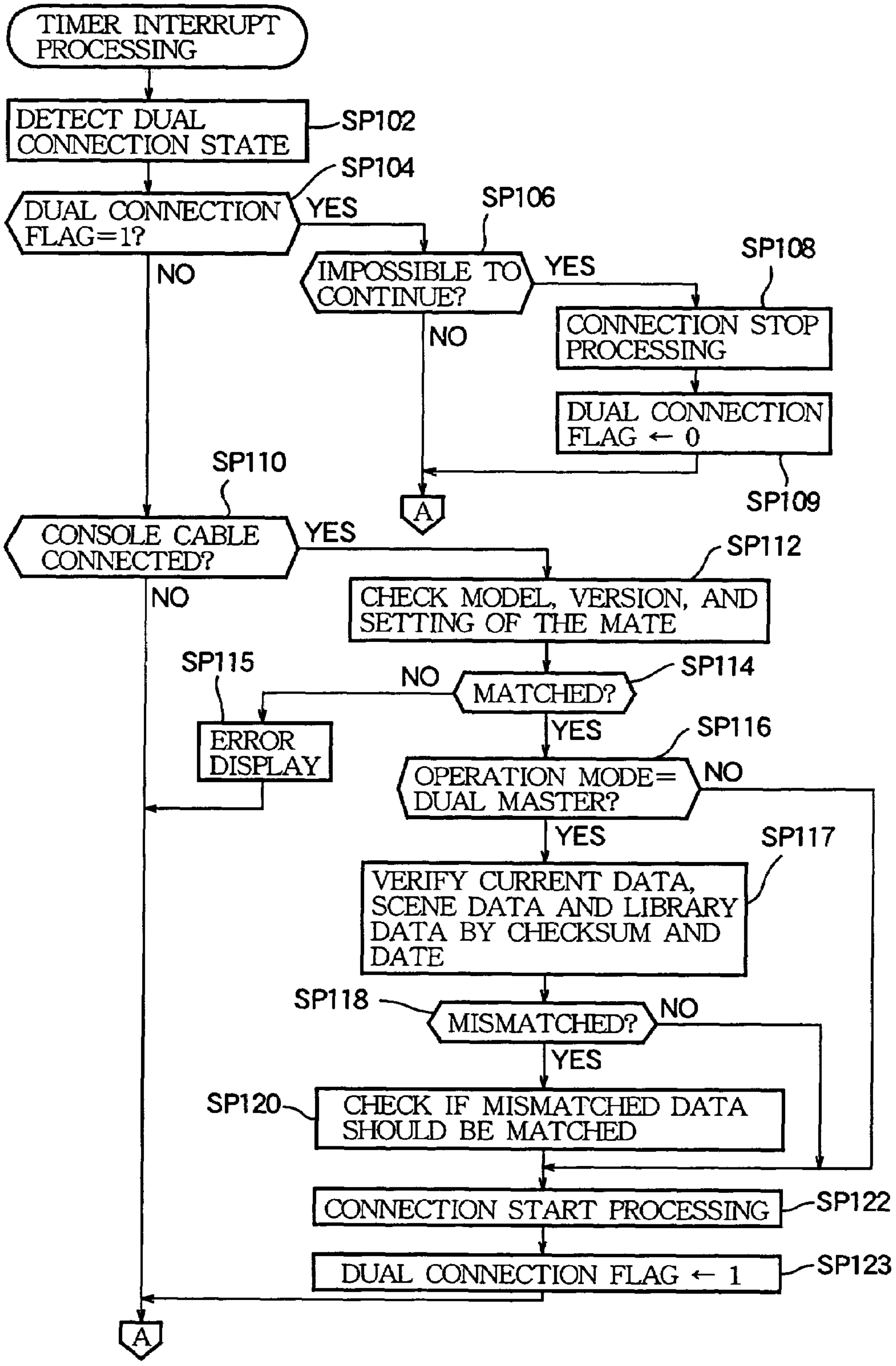
FIG. 11 is a flowchart describing another timer interrupt processing routine executed in each console.

Consequently, if the operation mode is set to "dual-console master" or "dual-console slave," the timer interrupt processing routine shown in FIG. 11 is started in each console at predetermined time intervals. In the figure, in step SP102, the timer interrupt processing routine determines whether the other console is connected via the dual I/O block 106. In step SP104, the routine determines whether a dual connection flag stored in the RAM 122 is "1". It should be noted that the dual connection flag is reset to"0" when the console is powered on and set to "1" when the other console is connected via the dual I/O block 106 of the console concerned.

If the dual connection flag is "0", the decision is "NO" in step SP104 and the routine goes to step SP110. In this step, the routine determines whether the other console is physically connected to the console concerned via the dual I/O block 106. If the decision is "YES", the routine goes to step SP112 to check the model, version, and operation mode setting state of the mate console. The version herein denotes the version of the firmware stored in the flash memory 120.

It should be noted that this dual connection flag establishes the operation state of each console in the dual-console system. Namely, in this routine, regardless that the operation mode is the dual-console master or the dual-console slave, each processing is executed on the assumption that the console concerned be initially the master console. When the dual connection flag is set to "1", the operation state of the console of which operation mode is the dual-console master is established as the master console and the operation state of the console of which operation mode is the dual-console slave is established as the slave console.

Next, in step SP114, the routine determines on the basis of the result of checking executed in step SP112 whether the own console and the mate console match the dual-console system. Namely, the models and firmware versions of both consoles must be the same. In addition, if the operation mode of the own console is the dual-console master, the operation mode of the mate console must always be the dual-console slave; conversely, if the operation mode of the own console is the dual-console slave, the operation mode of the mate console must always be the dual-console master.

If the checking result matches these conditions, the decision is "YES" and the routine goes to step SP116. In this step, the routine determines whether the operation mode of the console concerned is set to the dual-console master.

If the decision is "YES", the routine goes to step SP117, in which comparison is made in current operation data, scene data, and library data between the console concerned and the mate console set to the dual-console slave. It should be noted that, in this comparison, a very long transfer time is required if all of these data are transferred, so that the comparison is made on the basis of a checksum result and a time-stamp received from the slave console.

In step SP118, the routine determines whether there is a mismatch between the results of the comparison performed in step SP116. If a mismatch is found, the decision is "YES", then the routine goes to step SP120, in which the routine displays on the indicator 102 a popup window for asking the operator whether to match the data associated with the mismatch. This popup window shows a message "Transfer mismatch data to the mate console?" and an expected transfer time (for example, 20 minutes), "OK" button, and "Cancel" button.

Meanwhile, the data which may be transferred from the master console to the slave console are of three types; current operation data, scene data, and library data. The above-mentioned popup window shows any of these data that a mismatch has occurred. Namely, the popup window is displayed up to three times. When the operator clicks the "OK" button in any of the popup windows, the corresponding data are transferred from the master console to the slave console to be sequentially stored in the corresponding area 122*a*, 122*b*, or 122*c* in the slave console. It should be noted that a maximum of approximately "1000" sets of scene data are stored in the scene area 122*b*; whether or not these data have a mismatch is determined for every piece of scene data, so that, as the number of mismatching scene data diminishes, the transfer time becomes shorter.

Clicking the "Cancel" button halfway in the transfer, the operator can stop the transfer any time. When the data of all three types have been completed or when the "Cancel" button has been pressed, the routine goes to step SP122. In other words, if the scene data and so on are not completely matched between the master console and the slave console, they can be operated as the dual-console system. For example, if no scene change is performed for example, the scene data of both consoles may be left different. Such a capability is suitably for use especially in the quick startup of the dual-console system.

Next, in step SP122, the connection start processing is performed between the two consoles. To be more specific, an operation event processing routine and so on (FIGS. 13(*a*) through (*d*)) to be described later is validated to reflect an operation performed on one console onto the other console.

Figure 12:
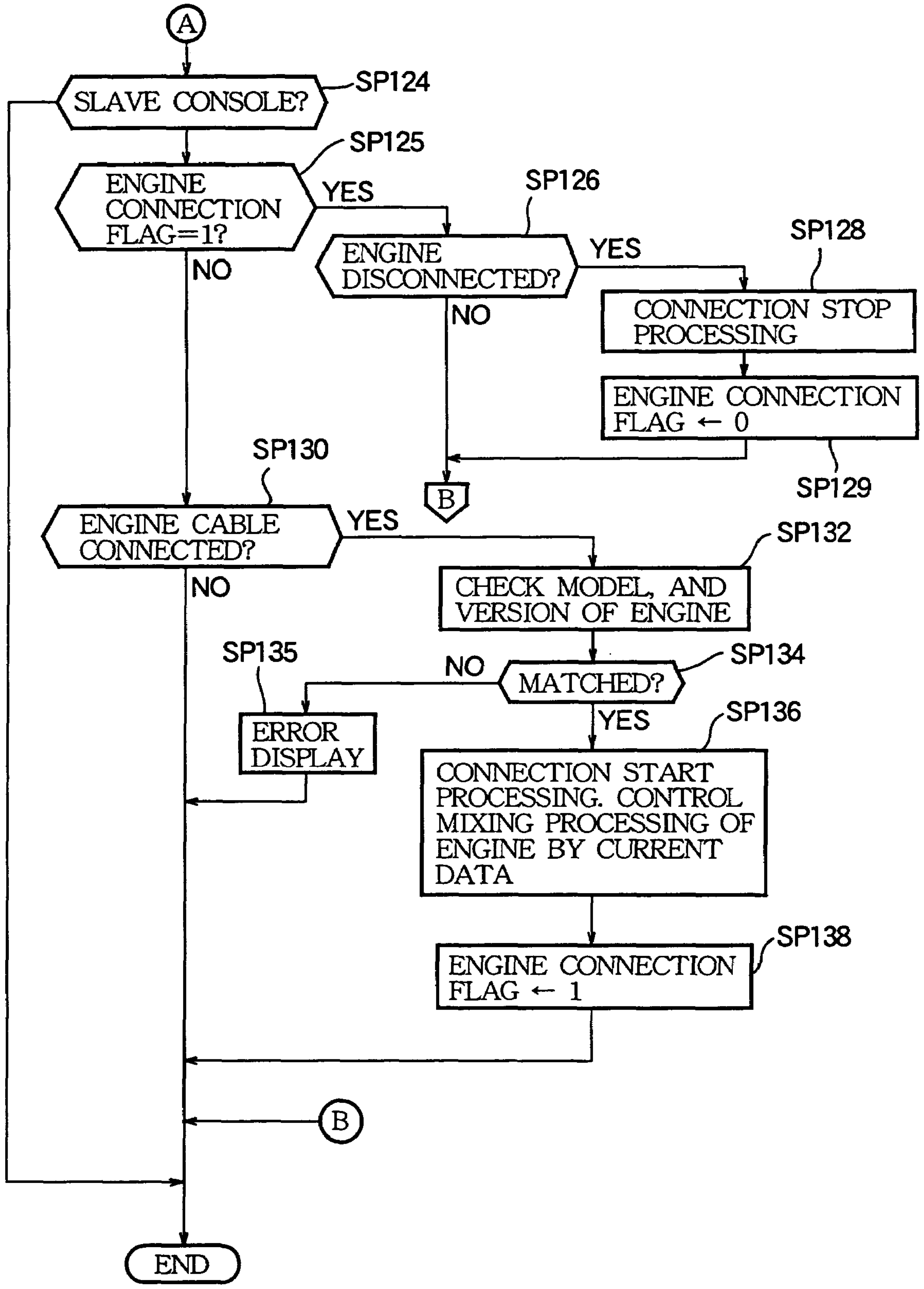
FIG. 12 is a flowchart continued from the flowchart shown in FIG. 11.

In step SP123, the dual connection flag is set to "1". When these steps have all been completed, the routine goes to step SP124 (FIG. 12).

If the decision is "NO" in step SP110, then the routine skips steps SP112 through SP123 and goes to step SP124. If the decision is "NO" in step SP114, then the routine goes to step SP115, in which a predetermined error display is performed on the indicator 102 of the console concerned, upon which the routine goes to step SP124. It should be noted that, in this error display, a message that the construction of the dual-console system has failed and its reason (model mismatch, version mismatch, or contradiction in setting) are shown.

If the operation mode of the console which executes the routine concerned is set to the dual-console slave, the decision is "NO" in step SP116, upon which the routine goes to step SP122 immediately. Consequently, in the slave console, the processing for starting the connection with the master console is executed without displaying the above-mentioned popup window.

In step SP124 (FIG. 12), the routine determines whether the console concerned is established as the slave console. As described above, if the operation mode is he dual console slave and the dual connection flag is "1", then the console concerned is established as the slave console.

In such a case, steps SP125 through SP138 associated with the engine connection are skipped. In other words, if an engine is connected to the console established as the slave console, no processing is performed on that engine.

If the console concerned is not established as the slave console, the routine goes to step SP125. The console of which operation mode is set to the dual-console slave with the dual connection flag still set to "0" is regarded also as this case, so that the routine goes to step SP125. In this step, the routine determines whether the engine connection flag is "1". If this flag is found to be "0", the decision is "NO" and the routine goes to step SP130. In this step, the routine determines whether the engine is physically connected via the data I/O block 110 and the communication I/O block 112. If the decision is "YES", the routine goes to step SP132 to check the model and firmware version of the engine concerned.

Next, in step SP134, the routine determines on the basis of the result of checking executed in step SP132 whether the engine concerned matches the console concerned. If the engine is found matching the console, the decision is "YES" and the routine goes to step SP136. In this step, the state of the signal processing block 202 in this engine is set on the basis of the contents of the current area 122*a*.

Next, in step SP138, the engine connection flag is set to "1", upon which this routine exits. It should be noted that if the decision is "NO" in step SP130, steps SP132 through SP138 are skipped, upon which this routine exits. If the decision is "NO" in step SP134, the routine goes to step SP135, in which a predetermined error display is performed on the indicator 102 of the console concerned, upon which this routine exits. It should be noted that, in this error display, a message that the connection with the engine has failed and its reason (model mismatch or version mismatch for example) are shown.

By the above-mentioned processing, the distinction between "master console" and "slave console" is established. Namely, the console of which dual connection flag and engine connection flag are both "1" is "master console," while the console of which dual connection flag is "1" and engine connection flag is "0" is "slave console."

Meanwhile, if the timer interrupt processing routine (FIG. 11) is started again after the dual connection flag is set to "1", the routine goes to step SP106 via steps SP102 and SP104. In step SP106, the routine determines whether the continuation of the dual-console system has been disabled. For example, if the cable connecting both the consoles is disconnected or if the consoles are both set to the master consoles, the continuation of the dual-console system is disabled. If the decision is "YES" in step SP106, then connection stop processing is executed in step SP108. Next, in step SP109, the dual connection flag is set to "0" and the processing of steps SP125 and on is executed.

If the processing of steps SP108 and SP109 has been executed on the master console or the slave console hitherto established, the console concerned will function as a single console.

If the timer interrupt processing routine (FIG. 11) is started again after the engine connection flag is set to "1", the routine goes to step SP126 via step SP125 in the master console. In step SP126, the routine determines whether the connection with the engine has been disconnected. For example, this case applies to the disconnection of the cable connecting the console and the engine or the turning-off of the power to the engine. If the decision is "YES" in step SP126, connection stop processing is executed in step SP128 and the engine connection flag is set to "0" in step SP129.

Figure 13:
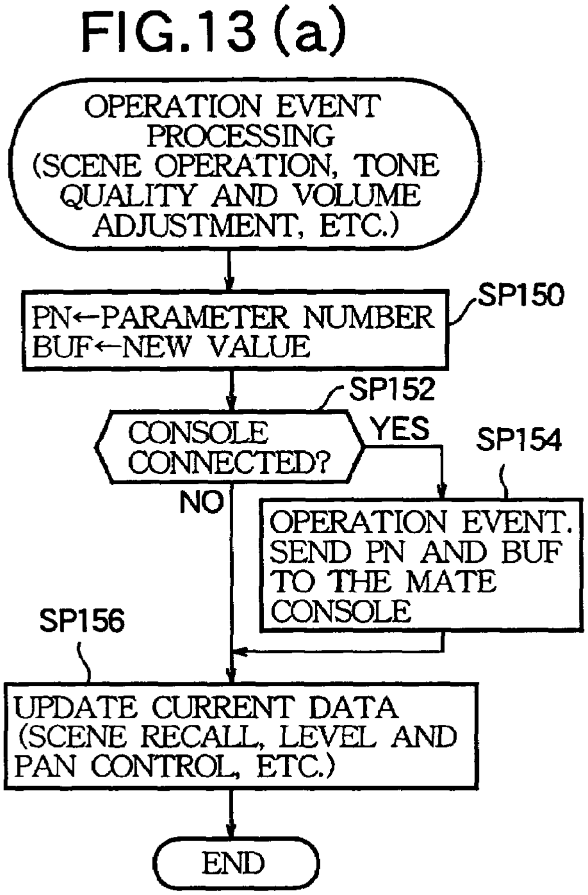
FIGS. 13(*a*) through 13(*d*) are flowcharts describing various event processing routines.
Figure 13:
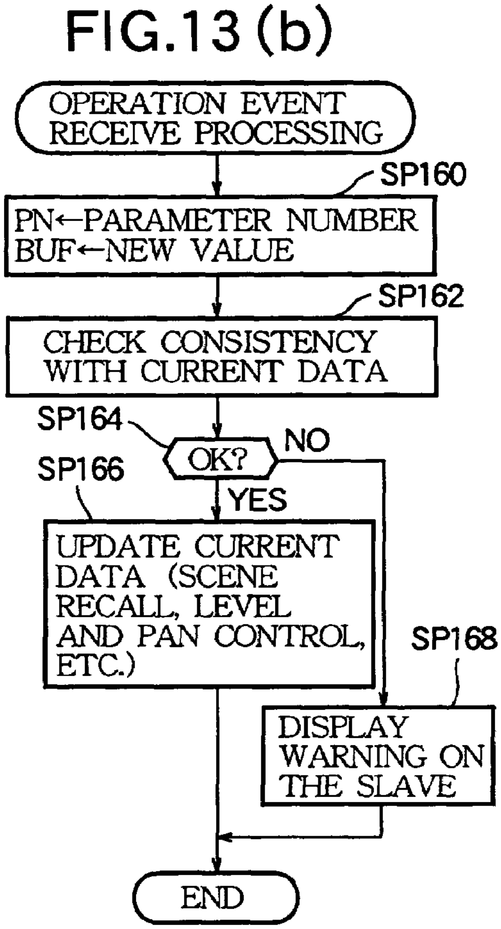
Figure 13:
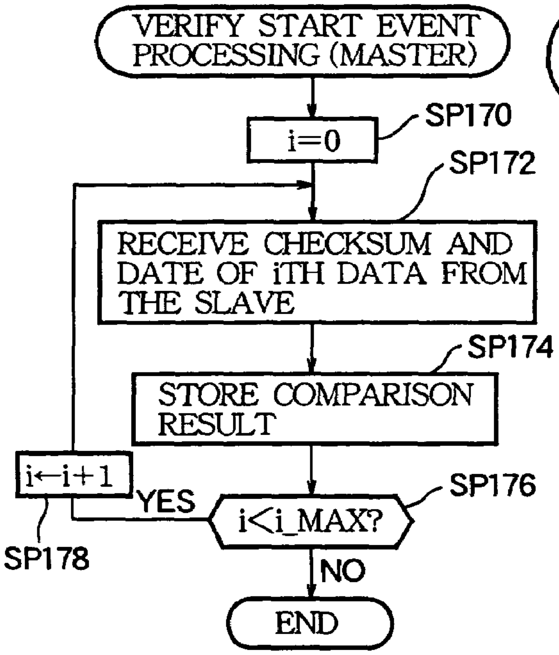
Figure 13:
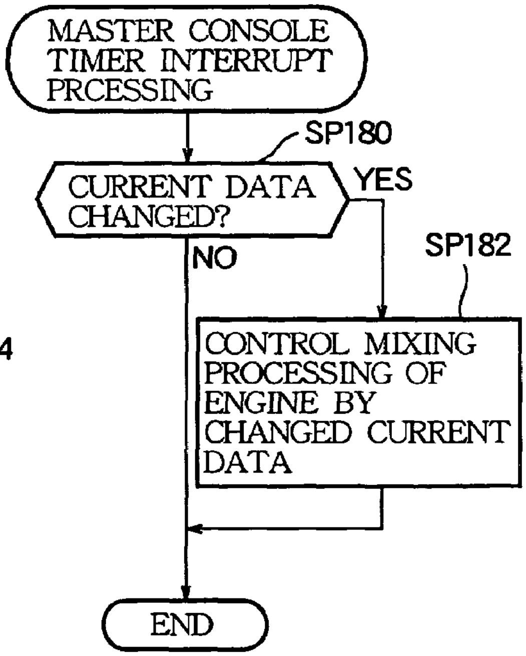

3.2.2 Master Console Timer Interrupt Processing: FIG. 13(*d*)

In the master console (or he single console), a timer interrupt processing routine shown in FIG. 13(*d*) is started at predetermined time intervals. It should be noted that this routine is executed more frequently than the timer interrupt processing routine shown in FIG. 11. In FIG. 13(*d*), the routine determines in step SP180 whether there has occurred any change in he current operation data. The current operation data are updated by an operation event processing routine (FIG. 13(*a*)) to be described next. If the decision is "YES" in this step, then the routine goes to step SP182, in which the parameters and so on of the algorithm of the mixing system of the corresponding engine on the basis of the updated data. The contents of the mixing process are controlled by this routine on the basis of the current operation data of the master console (or the single console).

3.2.3 Operation Event Processing Routine: FIG. 13(*a*)

Regardless of the master and the slave, if a predetermined operation event occurs on the motor-driven fader block 104 or the controls group 114 of one of the consoles, an operation event processing routine shown in FIG. 13(*a*) is started. "Predetermined operation event" herein denotes an operation for giving a change to the mixing system and includes a scene recall operation, a motor-driven fader operation, a tone quality adjusting operation, for example. Therefore, the operations for setting a cue signal CUE and a monitor signal MON_A and setting the allocation of controls (which function is allocated to which control) for example are not included in the "predetermined operation event."

In the figure, in step SP150, the parameter number for identifying an operated parameter is substituted into variable PN and a new value of this parameter after the operation into variable BUF. Next, in step SP152, the routine determines whether the console on which the operation has occurred is connected to the other console to configure a dual-console system.

If the decision is "YES", then the routine goes to step SP154, in which the contents of the detected operation event, namely the parameter number PN and the parameter number BUF, are transmitted to the mate console via the dual I/O block 106. It should be noted that, if the console concerned configures a single-console system, the decision is "NO" in step SP152 and therefore the processing of step SP154 is not executed. Next, in step SP156, the current operation data are updated in accordance with the contents of the operation. If the detected operation event is an operation of the motor-driven fader, then, among the current operation data, the data for controlling the volume of the input channel or output channel allocated to the motor-driven fader are updated in accordance with the position of this motor-driven fader in step SP156. If the detected operation event is a scene recall operation, then the above-mentioned scene recall event processing routine (FIG. 10(*a*)) is called in step SP156.

If a scene recall operation event occurs in the dual-console system, the parameter number PN is set to a value indicative of "scene recall" and the parameter value BUF is set to a scene number. It is possible here that the scene data having the same scene number are different between the master console and the slave console; however, this difference is not taken into consideration in this routine. This is one of the characteristics of the present invention. Namely, in the present embodiment, the information which is transferred between the consoles at the time of a scene recall operation is only the parameter number PN and the parameter value BUF, thereby significantly reducing the amount of information. Consequently, both consoles can quickly execute scene changes on the basis of the scene data held in each console.

3.2.4 Operation Event Receive Processing Routine: FIG. 13(*b*)

When the contents of an operation event are transmitted from the console on which an operation has occurred in the above-mentioned step SP154, an operation event receive processing routine shown in FIG. 13(*b*) is started on the console which has received the contents of the operation event.

In the figure, in step SP160, the received parameter number and parameter value are substituted into variables PN and BUF respectively. Next, in step SP162, the routine checks the parameter number PN and the parameter value BUF for the consistency with the current operation data.

To be more specific, it is preferable that the current operation data of both consoles match each other in the dual console system; however, as described in step SP120 above, if there is a mismatch between the current operation data or scene data of both consoles, a dual-console operation may be started by ignoring the mismatch. If the mismatch in the current operation data is ignored, the inconsistency may occur on both consoles from the beginning. If the scene data have a mismatch, the inconsistency may occur in the current operation data when the scene data concerned are recalled on both consoles.

The meaning of "inconsistency" is as follows. "Inconsistency" occurs "if, when a certain parameter is set, the number of parameters increases or decreases or the function of another parameter is changed (setting of input channel pairs or selection of effects for example)" for example. To be more specific, the inconsistency occurs "if a parameter specified by the parameter number is not valid" or "if an attempt has been made to set, to a parameter specified by the parameter number a parameter value which causes this parameter to get out of its change acceptable range, for example.

Next, in step SP164, the routine determines on the basis of the result of checking in step SP162 whether the operation event has the consistency. If the consistency is found, the decision is "YES" and the routine goes to step SP166, in which the current operation data are updated in accordance with the received operation event. If the decision is "NO" in step SP164, the routine goes to step SP168, in which a warning message indicative of the inconsistency is displayed on the indicator 102 of the slave console, upon which this routine exits.

The processing of step SP168 actually depends on whether this routine is executed on the master console or the slave console. Namely, if step SP168 is executed on the master console, a command is issued from the master console to the slave console to execute the warning display. When this command is received by the slave console, the warning display is executed on the slave console. Conversely, if step SP168 is executed on the slave console, the warning display is only executed on the indicator 102 of the slave console under the control of the CPU 118 of the slave console.

According to the above-mentioned operations, the state caused by the inconsistency which occurred on an operation event depends on the console on which the operation event occurred. Namely, if an operation event initially occurred on the master console, the current operation data of the master console are updated on the basis of that operation event in step SP156. Because, on the engine 200, the parameters and so on of the algorithm are set on the basis of the current operation data of the master console, the contents of the operation are reflected directly onto the parameters, thereby changing an audio signal to be outputted. Namely, from the viewpoint of the master console, a change properly occurs on the audio signal in accordance with the contents of the operation.

On the other hand, if the operation event having this inconsistency occurs on the slave console, step SP156 is executed on the slave console. However, the current operation data of the slave console are not reflected onto the parameters of the algorithm of the engine 200. On the master console, the decision is "NO" in step SP164 and therefore step SP166 is not executed, so that the current operation data of the master console are not updated. Hence, from the viewpoint of the slave console, a state occurs in which any operation of the corresponding control will not change the audio signal at all. For this reason, the warning display is executed by the slave console in step SP168.

3.2.5 Displaying Verify Screen

Figure 14:
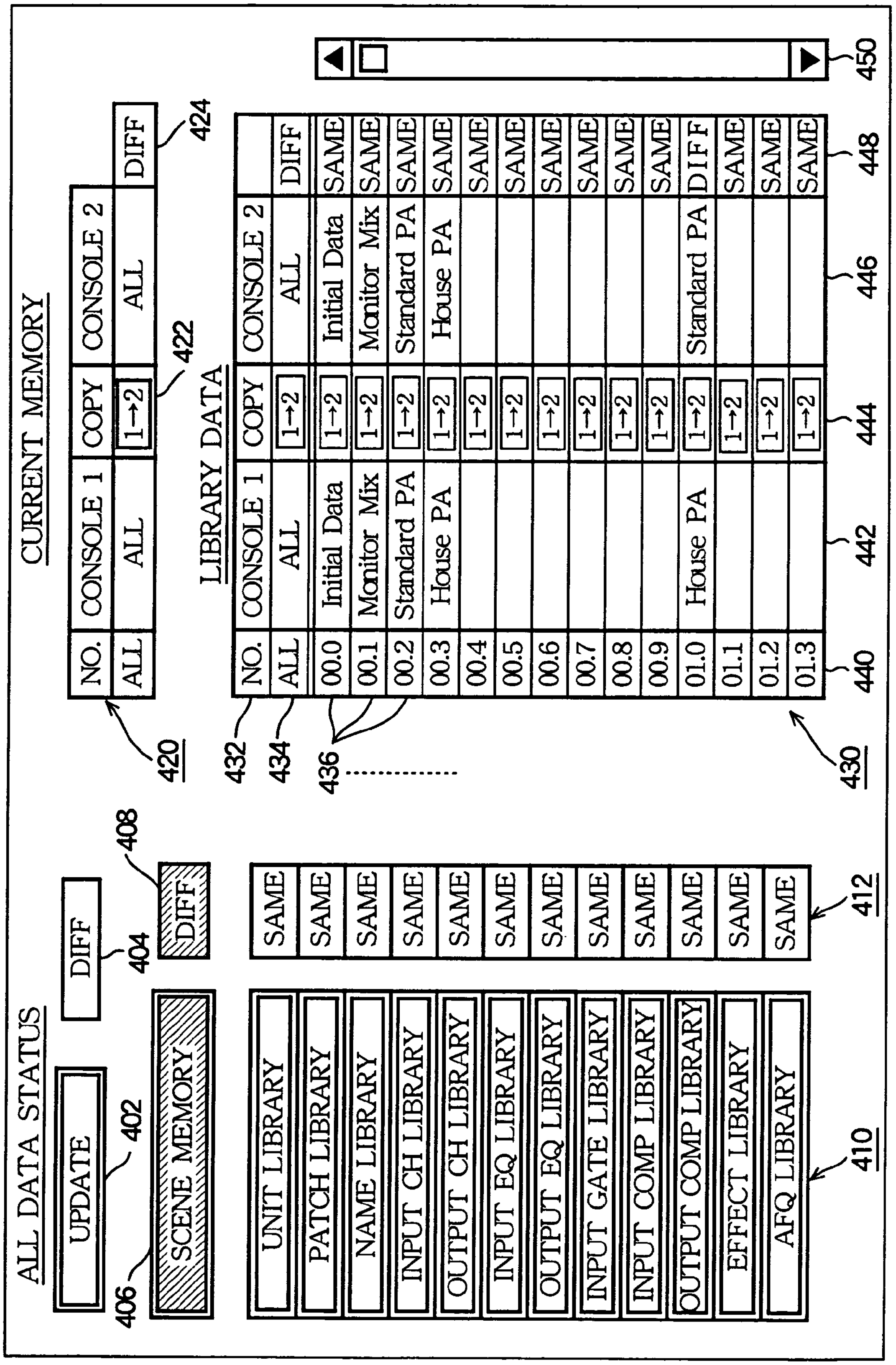
FIG. 14 is a diagram illustrating a verify/copy screen displayed on an indicator.

When a predetermined screen select operation has been performed on the master console, a verify/copy screen shown in FIG. 14 is displayed on the indicator 102 of this master screen. In FIG. 14, reference numeral 402 denotes an update button, which is clicked by the mouse to start a verify start event processing routine shown in FIG. 13(*c*). This routine checks the current operation, the scene data, and the library data for any difference between the master and slave consoles.

In step SP170 shown in FIG. 13(*c*), "0" is substituted into variable i. Next, in step SP172, the slave console is requested to send a checksum and a time stamp of ith data (current operation data, scene data, or library data). When the checksum and the time stamp are supplied from the slave console in response, the routine goes to step SP174. In this step, a comparison is made between the checksum and time stamp supplied from the slave console and the checksum and time stamp of the i-th data stored on the master console. The result of comparison is recorded in a predetermined area in the RAM 122 and the contents of the verify/copy screen (FIG. 14) are updated on the basis of the comparison result.

Next, in step SP174, the routine determines whether variable i is under maximum value i_MAX. If the decision is "YES", then variable i is incremented by "1" in step SP178. Subsequently, the processing operations of steps SP172 and SP174 are repeated for each piece of data until variable i reaches maximum value i_MAX. If the decision is "NO" in step SP176 and this routine exits, the verify/copy screen (FIG. 14) is updated on the basis of the most recent information.

Referring to FIG. 14, reference numeral 404 denotes a total difference display block. If the comparison result obtained in step SP174 indicates a difference in at least one piece of data, the total difference display block shows "DIFF" and, if the comparison result indicates no difference, the total difference display block shows "SAME". Reference numeral 406 denotes a scene data display command button, which is clicked by the mouse to display the details of scene data on a library list block 430 to be described later. Reference numeral 408 denotes a scene data difference display block, which shows "DIFF" if there is any difference in scene data for any scene number and "SAME" if there is a match among all scene data. It should be noted that the other difference display blocks to be described later show the difference in data in the same manner as above.

Reference numeral 410 denotes a library data display command button group composed of a plurality of display command buttons arranged for a unit library, a patch library, a name library, and other library data. When any of these buttons is clicked by the mouse, the details of the corresponding library are displayed on the library list block 430. Reference numeral 412 denotes a library data difference display block groups for displaying the difference between the master console and the slave console for each library data.

Reference numeral 420 denotes a current operation data status display block. A current difference display block 424 arranged in this current operation data status display block displays the difference in the current operation data between the master console ("CONSOLE 1" in the figure) and the slave console ("CONSOLE 2" in the figure). Reference numeral 422 denotes a copy command button, which is clicked by the mouse to copy the current operation data of the master console into the slave console.

The library list block 430 shows the details of the scene data or library data selected by the scene data display command button 406 or the library data display command button group 410. It should be noted that The library list block 430 is composed of a plurality of "columns". A number column 440 show data numbers. Reference numerals 442 and 446 denote item name display columns showing data names. Reference numeral 448 denotes a difference display column showing the difference for each data.

Reference numeral 444 denotes a copy command button column, which is clicked by the mouse to copy the corresponding data of the master console into the slave console. The library list block 430 is composed of a plurality of rows 436, 436, and so on, a top row 434 representing the entire scene data or library data. Namely, the difference display column 448 in the top row 434 shows "DIFF" if there is difference in at least one piece of data and "SAME" if all data match each other. When the copy command button in the top row 434 is clicked by the mouse, the entire data having difference among the scene data or the library data are copied from the master console into the slave console. When the copy command button in the row 436 other than the top row is clicked by the mouse, the data corresponding to that row among the scene data or the library data are copied from master console into the slave console. Reference numeral 450 denotes a scroll bar for scrolling the rows 436, 436, and so on other than the top row 434 up and down.

It should be noted that, according to the above-mentioned operation event processing routine (FIG. 13(*a*)) and operation event receive processing routine (FIG. 13(*b*)), when a scene recall operation or a library recall operation is performed on one of the consoles, a verify operation for the scene data or library data is automatically performed on the other console (SP162). Therefore, when the verify/copy screen (FIG. 14) is displayed on the indicator 102 after performing the above-mentioned recall operation, the operator may check the recalled scene data or library data for any difference without especially operating the update button 402.

4. Variations

The present invention is not restricted to the above-mentioned embodiment and may be practiced or embodied in still other ways as follows without departing from the spirit thereof.

(1) In the above-mentioned embodiment, various processing operations are executed by means of programs which operate on the console or the engine. These programs alone may be stored in a recording medium such as a CD-ROM or a flexible disk for example or over transmission paths for the purpose of distribution.

(2) In the above-mentioned embodiment, the console and the engine are configured as separate units. It will be apparent that the console and the engine may be integrated in one unit.

(3) In the above-mentioned embodiment, all monitor systems, namely the first monitor system (the monitor selector 250, the first monitor signal MON1, and the COMM-IN signal COMM_IN_1), the second monitor system (the monitor selector 252, the second monitor signal MON2, and the COMM-IN signal COMM_IN_2), the first cue signal CUE1 (the cue bus 246), and the second cue signal CUE2 (the cue bus 248), are often configured in a stereo manner. It will be apparent that the monitor systems may be configured in a monaural manner or in a multi-channel manner such as the 5.1 channel for example.

Figure 3:
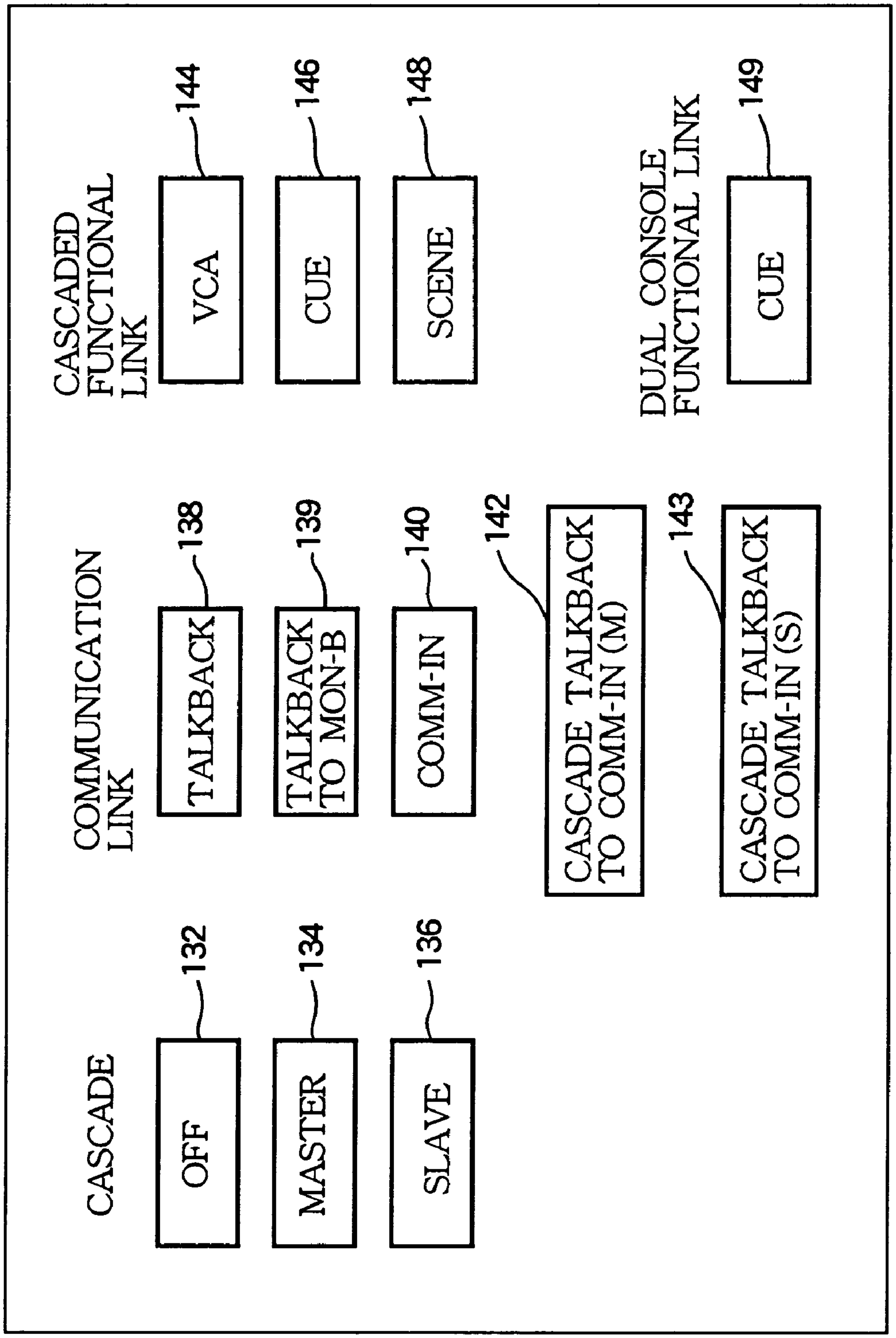
FIG. 3 is an external view of the main portion of an operator controls group.

(4) In the above-mentioned embodiment, the set of switches 132 through 149 shown in FIG. 3 is arranged on each console. It is also practicable to arrange two sets of these switches on each console, thereby allowing each console to control the state of the other console.

(5) In step SP216 in the above-mentioned embodiment, the mixing bus 244*e* and the mixing bus 244*f*, which are independent of each other, are automatically linked in the engine 200E and the engine 200F (refer to FIG. 5). It will be apparent that all "48" buses of the mixing buses 244*e* and 244*f* need not be linked; instead, an off/off switch may be arranged for each bus so as to specify the link on/off state for each bus.

As described and according to the first aspect of the invention, after a scene recall request and a recall enabling response are exchanged between a first mixing system and a second mixing system, the contents of the mixing process is reconstructed in each mixing system, so that the processing contents may be reconstructed in the plurality of mixing systems in approximately the same timed relation.

According to the second aspect of the invention, it is determined whether a plurality of mixing systems can operate in a cooperative manner and, if these mixing systems are found to operate in a cooperative manner, the talk signal in one mixing system is used to influence the monitor signal in another mixing system, or the talkback signals in the plurality of mixing systems are mixed together. This novel configuration provides an optimum communication environment in accordance with the installation conditions of consoles and so on.

According to the third aspect of the invention, an input added signal generated and delayed in one digital mixer is added to a cascade signal inputted from another digital mixer, so that a phase difference caused by the transmission delay of this cascade signal can be compensated by the input added signal, thereby providing the mixing results having the same phase in all digital mixers. Consequently, each digital mixer can have high independency from others while exchanging the mixing results therebetween.

According to the fourth aspect of the invention, the configuration in which, at the time of linking the first console and the second console, the first control data and the second control data are checked for any inconsistency between them, may enhance the reliability of the control data in both consoles. In addition, the configuration in which an operation event for recalling control data that takes place on one of the first console and the second console is transmitted to the other console may recall the control data quickly and in approximately the same timed relation on both consoles.

According to the fifth aspect of the invention, the active state of a first monitor signal is set on the basis of a select operation performed on a first console and the active state of a second monitor signal is set on the basis of a select operation performed on a second console. This novel configuration provides a monitoring environment which provides a high degree of freedom for a plurality of operators and a high independency between the operations performed by these operators.

What is claimed is:

1. A method of controlling a total mixing system including a first mixing system and a second mixing system, which are operated in a linked manner with each other, the method comprising:

a first storage step for storing first scene data specifying contents of a mixing process;

a second storage step for storing second scene data specifying contents of a mixing process;

a first transmission step for transmitting a scene recall request from said first mixing system to said second mixing system when a recall event of said first scene data occurs in said first mixing system;

a second transmission step for transmitting back a recall enabling response from said second mixing system to said first mixing system after said second mixing system receives said scene recall request;

a first reconstruction step for reconstructing the contents of the mixing process by said first mixing system on the basis of said first scene data after the reception of said recall enabling response by said first mixing system; and a second reconstruction step for reconstructing the contents of the mixing process by said second mixing system on the basis of said second scene data after the transmission of said recall enabling response by said second mixing system.

2. The method according to claim 1, further comprising a recall start command transmission step for transmitting a recall start command to said second mixing system after said recall enabling response is received in said first mixing system, wherein said first reconstruction step is executed in said first mixing system after the completion of said recall start command transmission step, and said second reconstruction step is executed after the reception of said recall start command by said second mixing system.

3. The method according to claim 2, further comprising a parameter transmission step for transmitting linked parameters of the mixing process linked between the first mixing system and the second mixing system to said second mixing system after the reception of said recall enabling response by said first mixing system, wherein said recall start command transmission step is executed after the end of said parameter transmission step.

4. The method according to claim 1, wherein the total mixing system includes a plurality of mixing systems which are interconnected to each other, each mixing system being capable of inputting and outputting a talk signal and outputting a monitor signal, the method further comprising:

a determination step for determining whether said plurality of said mixing systems can operate in a cooperative manner with one another; and an influencing step for influencing a talk signal in one mixing system to a monitor signal in another mixing system if said plurality of said mixing systems are found capable of operating in a cooperative manner.

5. The method according to claim 4, wherein each of said plurality of said mixing systems has at least one console in which said monitor signal is received and in which a talkback signal is outputted as said talk signal, and wherein said influencing step mixes the talkback signal in said one mixing system with the monitor signal in said another mixing system.

6. The method according to claim 4, wherein each of said plurality of said mixing systems has at least one console in which said monitor signal is received, a talkback signal is outputted as said talk signal, and a volume of said monitor signal is automatically attenuated at the time of inputting said talkback signal, and wherein said influencing step also attenuates a volume of a monitor signal in said another mixing system in a cooperative manner when said talkback signal is inputted in said one mixing system and the volume of said monitor signal in said one mixing system is automatically attenuated.

7. The method according to claim 4, wherein each of said plurality of said mixing systems has at least one console in which said monitor signal is received and a communication signal is received as said talk signal from outside, and wherein said influencing step mixes said communication signal supplied to said one mixing system with said monitor signal in said another mixing system.

8. The method according to claim 7, further comprising, after said determination step and before said influencing step:

an adding step for adding a communication signal supplied to said one mixing system to a communication signal supplied to said another mixing system; and a gate step for gating the added communication signal only if a signal level of said added communication signal exceeds a predetermined threshold level.

9. The method according to claim 1, wherein the total mixing system includes a plurality of mixing systems which are interconnected to each other, each mixing system being capable of outputting a talkback signal as the talk signal, the method further comprising:

a determination step for determining whether said plurality of said mixing systems can operate in a cooperative manner with one another; and an output step for mixing the talkback signal in one mixing system with the talkback signal in another mixing system and outputting a resultant mixed signal as a talkback output signal in the respective mixing systems if said plurality of said mixing systems are found capable of operating in a cooperative manner.

10. The method according to claim 1, wherein the total mixing system includes a plurality of mixing systems each having a digital mixer for mixing input signals of audio, the method further controlling a mixing process of one digital mixer, the mixing process comprising:

a first adding step for adding a plurality of input signals and outputting an input added signal;

a cascade output step for outputting said input added signal as a cascade signal;

a cascade input step for inputting another cascade signal inputted from another digital mixer;

a delay step for delaying said input added signal; and a second adding step for adding said delayed input added signal and said inputted cascade signal with each other and outputting the resultant added signal as a mixing output signal.

11. The method according to claim 10, wherein the mixing process further comprises an on/off step for turning on or off a link between said one digital mixer and said another digital mixer, such that the second adding step adds said delayed input added signal and said inputted cascade signal and outputs the resultant added signal as a mixing output signal if said link is turned on and otherwise the second adding step outputs said delayed input added signal as a mixing output signal without change if said link is turned off.

12. The method according to claim 10, further comprising a determination step for determining whether said one digital mixer is capable of cooperating with said another digital mixer, such that said second adding step adds said delayed input added signal and said inputted cascade signal with each other and outputs the resultant added signal as said mixing output signal if the cooperation is found in said determination step.

13. A program embodied on a computer-readable medium and designed to run in a total mixing system including a first mixing system and a second mixing system which are operated in a linked manner with each other, the program for causing a computer to execute a method of controlling the total mixing system, wherein the method comprises:

a first storage step for storing first scene data specifying contents of a mixing process;

a second storage step for storing second scene data specifying contents of mixing process;

a first transmission step for transmitting a scene recall request from said first mixing system to said second mixing system when a recall event of said first scene data occurs in said first mixing system;

a second transmission step for transmitting back a recall enabling response from said second mixing system to said first mixing system after said second mixing system receives said scene recall request;

a first reconstruction step for reconstructing the contents of the mixing process by said first mixing system on the basis of said first scene data after the reception of said recall enabling response by said first mixing system; and a second reconstruction step for reconstructing the contents of the mixing process by said second mixing system on the basis of a second scene data after the transmission of said recall enabling response by said second mixing system.

14. The computer program embodied on the computer-readable medium according to claim 13 for executing the method, which further comprises a recall start command transmission step for transmitting a recall start command to said second mixing system after said recall enabling response is received in said first mixing system, such that said first reconstruction step is executed in said first mixing system after the completion of said recall start command transmission step, and said second reconstruction step is executed after the reception of said recall start command by said second mixing system.

15. The computer program embodied on the computer-readable medium according to claim 13 for executing the method of controlling a total mixing system, wherein the total mixing system includes a plurality of mixing systems which are interconnected to each other, each mixing system being capable of inputting and outputting a talk signal and outputting a monitor signal, and wherein the method further comprises:

a determination step for determining whether said plurality of said mixing systems can operate in a cooperative manner with one anther; and an influencing step for influencing a talk signal in one mixing system to a monitor signal in another mixing system if said plurality of said mixing systems are found capable of operating in a cooperative manner.

16. The computer program embodied on the computer-readable medium according to claim 13 for executing the method of controlling a total mixing system, wherein the total mixing system includes a plurality of mixing systems which are interconnected to each other, each mixing system being capable of outputting a talkback signal as the talk signal, and wherein the method further comprises:

a determination step for determining whether said plurality of said mixing systems can operate in a cooperative manner with one another; and an output step for mixing the talkback signal in one mixing system with the talkback signal in another mixing system and outputting a resultant mixed signal as a talkback output signal in the respective mixing systems if said plurality of said mixing systems are found capable of operating in a cooperative manner.

17. The computer program embodied on the computer-readable medium according to claim 13 for executing the method of controlling a total mixing system, wherein the total mixing system includes a plurality of mixing systems each having a digital mixer for mixing input signals of audio, and wherein the method further controls a mixing process of one digital mixer, the mixing process comprising:

a first adding step for adding a plurality of input signals and outputting an input added signal;

a cascade output step for outputting said input added signal as a cascade signal;

a cascade input step for inputting another cascade signal inputted from another digital mixer;

a delay step for delaying said input added signal; and a second adding step for adding said delayed input added signal and said inputted cascade signal with each other and outputting the resultant added signal as a mixing output signal.

18. A total mixing system comprising a first mixing system and a second mixing system, which are operated in a linked manner with each other, wherein said first mixing system comprises:

a first storage that stores first scene data specifying contents of a mixing process:

a first transmission part that transmits a scene recall request from said first mixing system to said second mixing system when a recall event of said first scene data occurs in said first mixing system;

a first reception part that receives a recall enabling response from said second mixing system;

a first reconstruction part that reconstructs the contents of the mixing process of said first mixing system on the basis of said first scene data after the reception of said recall enabling response, and wherein said second mixing system comprises:

a second transmission part that transmits said recall enabling response to said first mixing system after said second mixing system receives said scene recall request; and a second reconstruction part that reconstructs the contents of the mixing process of said second mixing system on the basis of a second scene data after the transmission of said recall enabling response to said first mixing system.

19. The total mixing system according to claim 18 wherein said first mixing system further comprises a recall start command transmission part that transmits a recall start command to said second mixing system after said recall enabling response is received by said first mixing system, such that said first reconstruction part reconstructs the contents of the mixing process of said first mixing system after the recall start command transmission part transmits said recall start command, and said second reconstruction part reconstructs the contents of the mixing process of said second mixing system after said second mixing system receives said recall start command.

20. The total mixing system according to claim 18, wherein the total mixing system includes a plurality of mixing systems which are interconnected to each other, each mixing system being capable of inputting and outputting a talk signal and outputting a monitor signal, and wherein the total mixing system further comprises:

a determination part that determines whether said plurality of said mixing systems can operate in a cooperative manner with one anther; and an influencing part that influences a talk signal in one mixing system to a monitor signal in another mixing system if said plurality of said mixing systems are found capable of operating in a cooperative manner.

21. The total mixing system according to claim 18, wherein the total mixing system includes a plurality of mixing systems which are interconnected to each other, each mixing system being capable of outputting a talkback signal, and wherein the total mixing system further comprises:

a determination part that determines whether said plurality of said mixing systems can operate in a cooperative manner with one another; and an output part that mixes the talkback signal in one mixing system with the talkback signal in another mixing system and outputs a resultant mixed signal as a talkback output signal in the respective mixing systems if said plurality of said mixing systems are found capable of operating in a cooperative manner.

22. The total mixing system according to claim 18, wherein the total mixing system includes a plurality of mixing systems each having a digital mixer for mixing input signals of audio, and wherein one of the plurality of the mixing systems comprises:

a control part that controls a mixing process of one digital mixer;

a first adding part that adds a plurality of input signals and outputs an input added signal;

a cascade output part that outputs said input added signal as a cascade signal;

a cascade input part that inputs another cascade signal inputted from another digital mixer;

a delay past that delays said input added signal; and a second adding part that adds said delayed input added signal and said inputted cascade signal with each other and outputs the resultant added signal as a mixing output signal.

* * * * *